(12) United States Patent
Mizumoto

(10) Patent No.: US 7,864,390 B2
(45) Date of Patent: Jan. 4, 2011

(54) IMAGE DISPLAY APPARATUS

(75) Inventor: Kenji Mizumoto, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 436 days.

(21) Appl. No.: 12/125,228

(22) Filed: May 22, 2008

(65) Prior Publication Data

US 2008/0297868 A1 Dec. 4, 2008

(30) Foreign Application Priority Data

May 28, 2007 (JP) ............................. 2007-140193
Mar. 26, 2008 (JP) ............................. 2008-080722

(51) Int. Cl.
G02B 26/08 (2006.01)

(52) U.S. Cl. ................................. 359/199.1; 359/224.1

(58) Field of Classification Search .............. 359/199.1, 359/212.1, 212.2, 213.1, 214.1, 223.1, 224.1, 359/225.1, 226.1

See application file for complete search history.

(56) References Cited

U.S. PATENT DOCUMENTS

2007/0070481 A1* 3/2007 Nishikawa et al. .......... 359/201

FOREIGN PATENT DOCUMENTS

JP 11-14622 A 5/1999
WO WO 02/37165 A1 5/2002

* cited by examiner

Primary Examiner—Euncha P Cherry
(74) Attorney, Agent, or Firm—Sidley Austin LLP

(57) ABSTRACT

An image display apparatus capable of displaying an image on a plane of projection by beam raster scanning associated with resonant oscillation in a horizontal scanning direction (the main scanning direction), includes a resonance-point detector for detecting a mechanical resonant frequency in the horizontal scanning direction. Out of frequencies that are multiples of a vertical synchronizing frequency in image display, for example a frequency nearest to the mechanical resonant frequency detected in the resonance-point detector is determined as a horizontal scanning frequency of the raster scanning. The image display apparatus can thus provide a stable image display with ease.

11 Claims, 16 Drawing Sheets

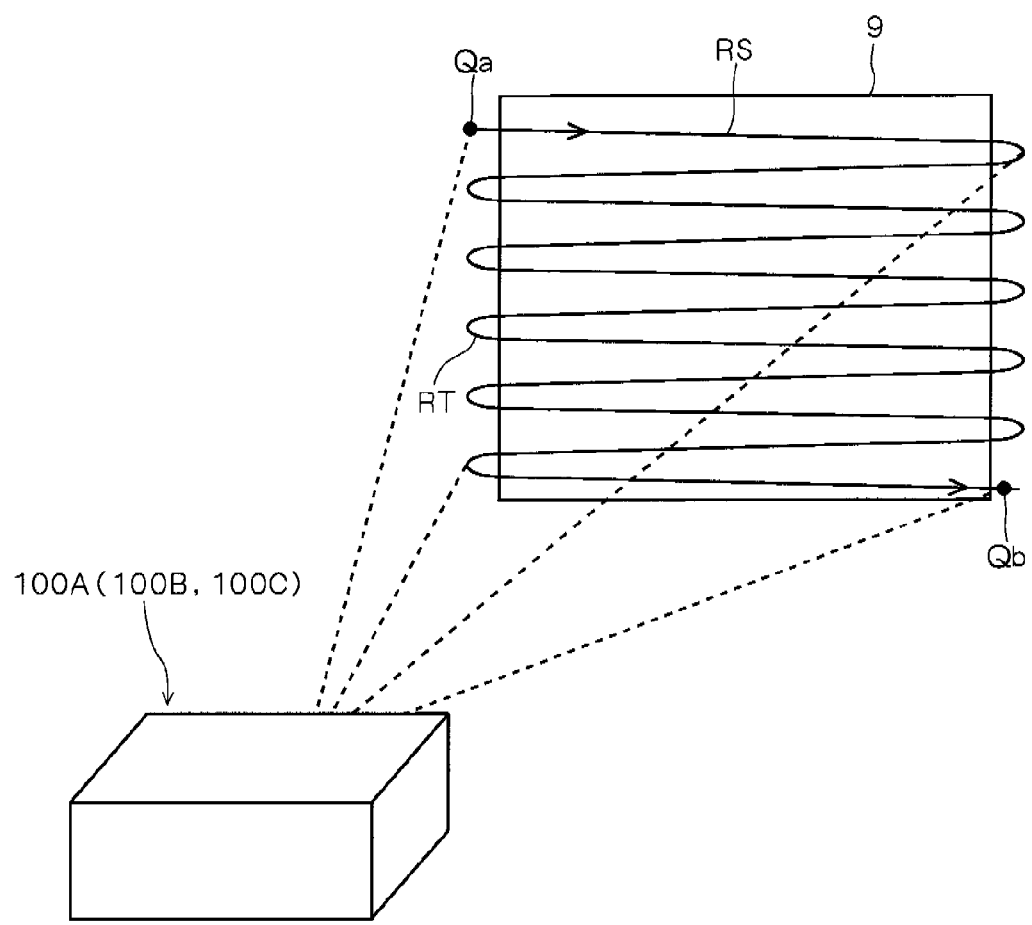

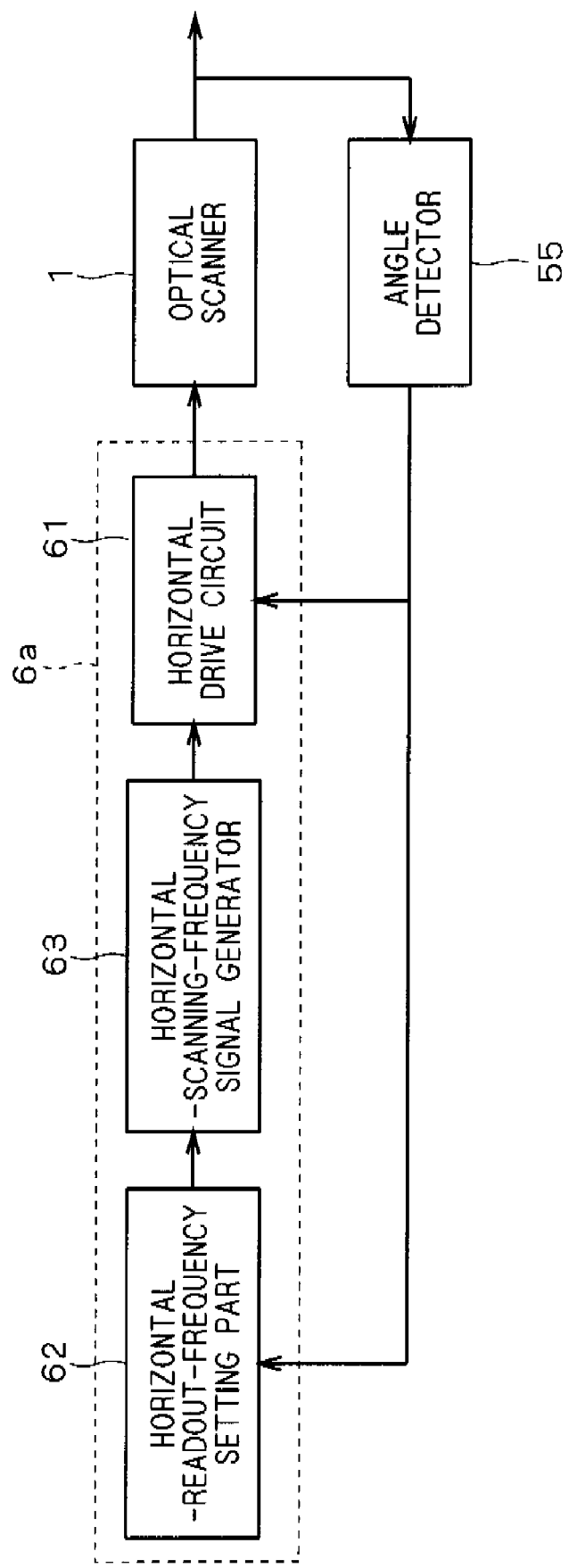
F I G. 9

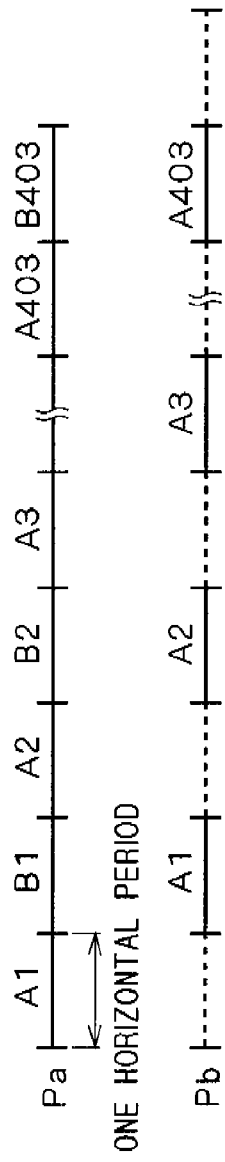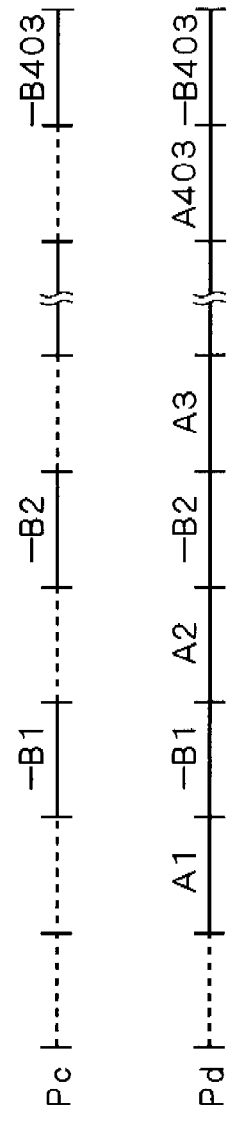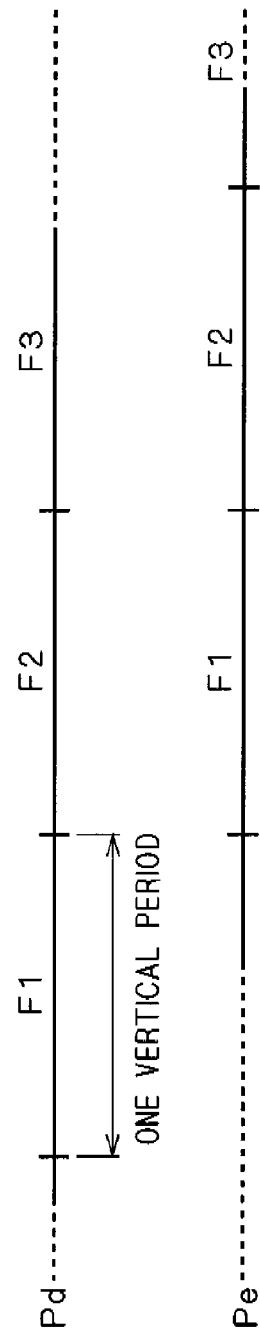

F I G. 1 3
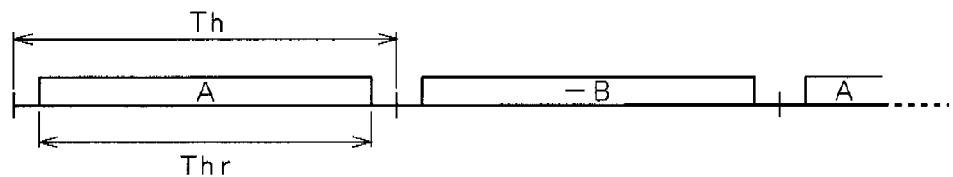
F I G. 1 4 A
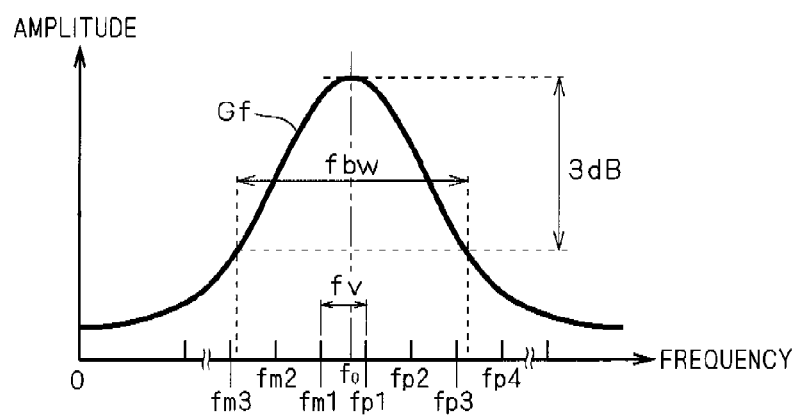
F I G. 1 4 B
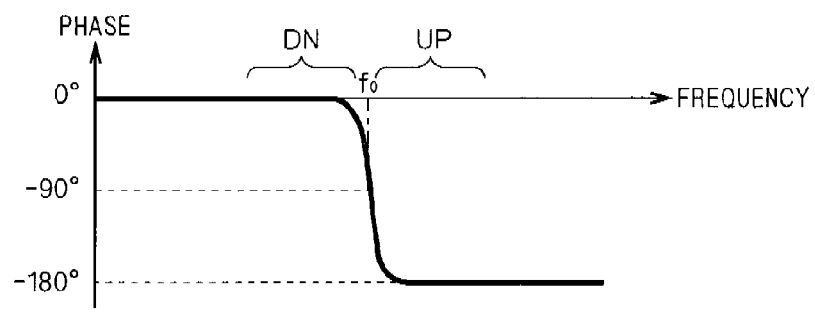

F I G . 1 7 A
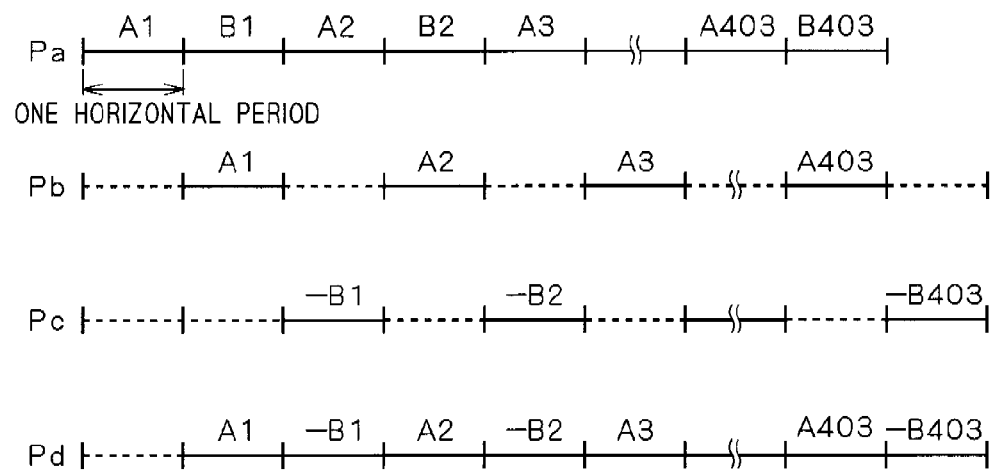
F I G . 1 7 B
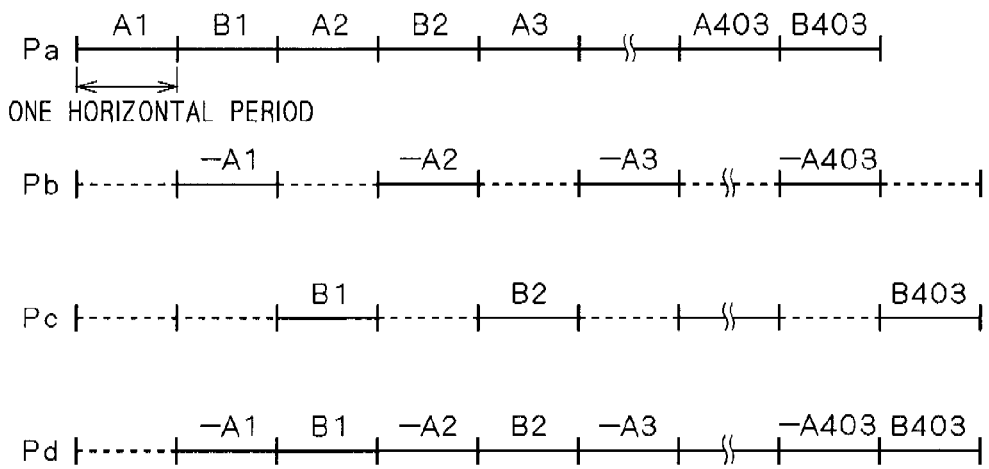

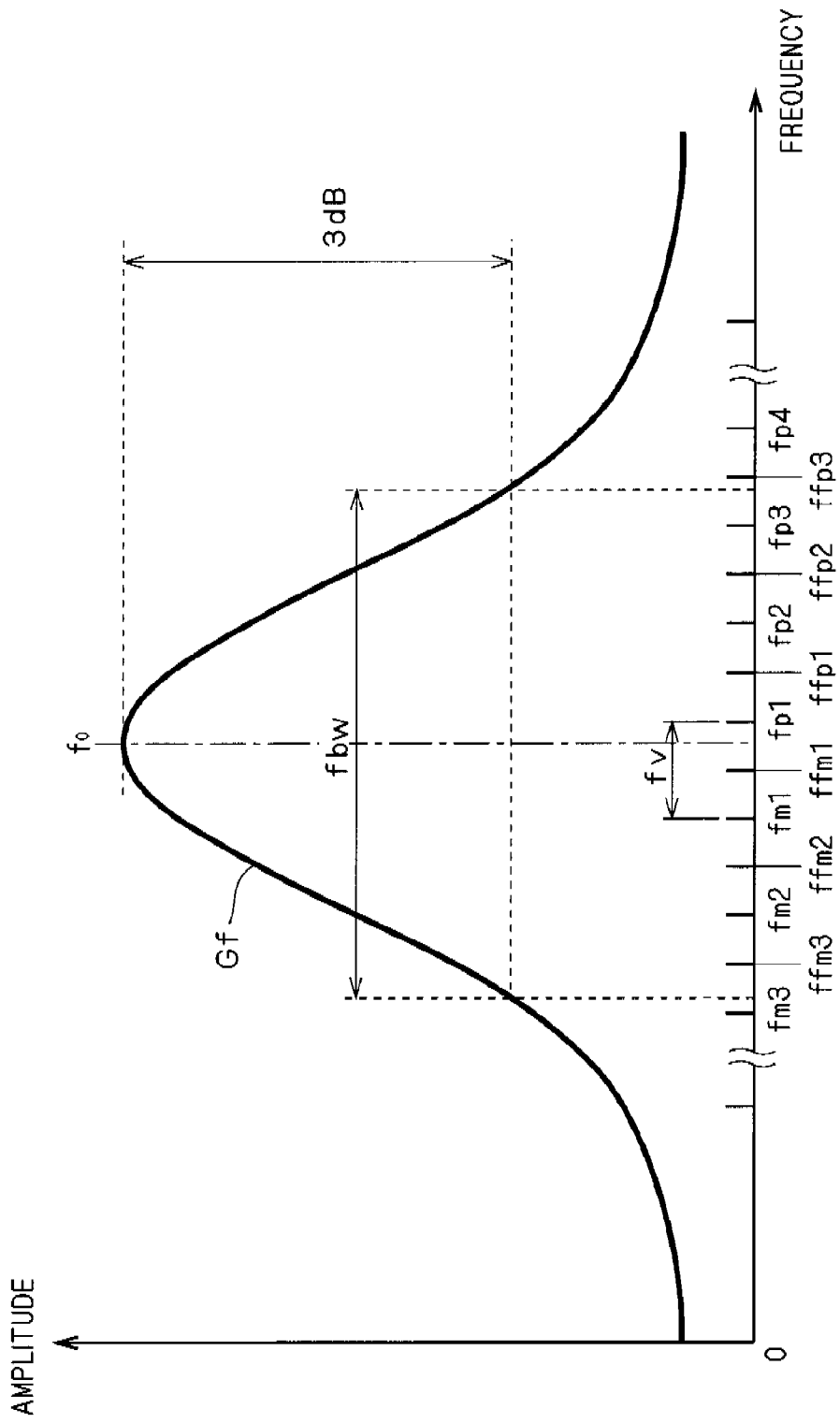

F I G. 1 9
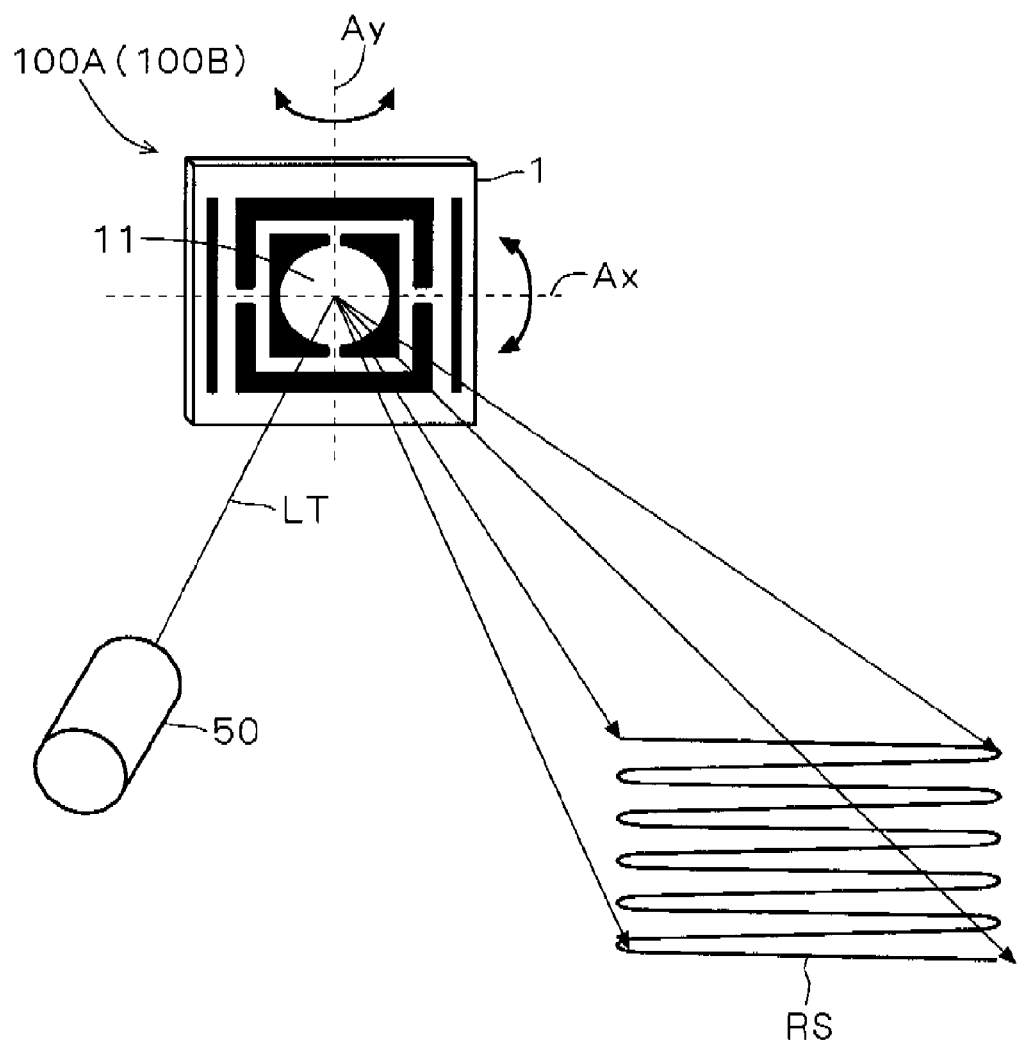

IMAGE DISPLAY APPARATUS

This application is based on Application Nos. 2007-140193 and 2008-080722 filed in Japan, the contents of which are hereby incorporated by reference.

BACKGROUND OF THE INVENTION

1. Field of the Invention

The present invention relates to an image display apparatus capable of displaying an image on a given plane of projection by beam raster scanning.

2. Description of the Background Art

Optical scanners deflecting and scanning light beams such as laser beams are utilized for optical equipment such as a barcode reader, a laser printer, and a display. Some such optical scanners include a polygon mirror scanning reflected light by rotation of a polygonal shaped mirror with a motor, a galvano-mirror causing a plane mirror to rotate and oscillate with an electromagnetic actuator, or the like. Such optical scanners require mechanical drive mechanisms for driving a mirror with a motor or with an electromagnetic actuator; however, such drive mechanisms are relatively large in size and expensive, inhibiting miniaturization of the optical scanners and increasing the cost thereof.

For miniaturization, cost reduction, and improved productivity of optical scanners, development of micro optical scanners where components such as mirrors and elastic beams are molded in one piece is now in progress using micromachining technologies for micromachining silicon or glass with application of semiconductor manufacturing technologies.

There is an image display apparatus which is provided with two such optical scanners as described above and displays a two-dimensional image on a plane of projection by raster scanning of light beams reflected off mirrors of those scanners.

This image display apparatus can provide a stable image display by bringing an image signal of a displayed image into synchronization with raster scanning (horizontal and vertical scanning). However in horizontal scanning where in general a mirror makes resonant oscillations for a horizontal scan output of greater amplitude, it is not easy to match the resonant frequency (horizontal scanning frequency) of the resonant oscillations and the horizontal synchronizing frequency of the image signal for synchronization. Some well-known techniques for synchronization are described in the following paragraphs (i), (ii), and (iii).

(i) In the designing or manufacturing stage of an optical scanner, the resonant frequency is made approximately equal to the horizontal synchronizing frequency of an image signal.

(ii) An image frame (image signal) is temporarily stored in a buffer memory and a readout clock is generated, using a PLL circuit, from a drive signal for horizontal scanning including resonant oscillations, based on which clock an image signal for each horizontal line is read out from the above-described buffer memory (see for example Japanese Patent Application Laid-open No. JP11-146222).

(iii) An optical scanner is used, which has a configuration capable of controlling the resonant frequency. For example as in the technique disclosed in Published Japanese Translation of PCT International Application No. 2004-518992, an electric field is applied to a flexible arm extending from an vibrator (mirror), causing a bending of the arm and thereby changing the moment of inertia of the vibrator, for resonant frequency control.

The technique described in the above paragraph (i), however, may cause substantial changes in the output of horizontal scanning (horizontal scan width) with fluctuations in the resonant frequency due to environmental changes such as temperature or changes with time, thereby having difficulty in providing a stable image display by beam raster scanning accompanied with resonant oscillations in the horizontal scanning direction (the main scanning direction).

The technique described in the above paragraph (ii) requires an additional circuit such as the PLL circuit described above, thereby complicating the device configuration.

The technique described in the above paragraph (iii), although capable of controlling the resonant frequency, necessitates a complicated structure for that control.

SUMMARY OF THE INVENTION

The present invention is directed to an image display apparatus capable of displaying an image on a given plane of projection by beam raster scanning.

According to the invention, the image display apparatus includes: (a) an actuator part capable of causing a movable part to oscillate about a first axis and a second axis, the movable part having a reflecting surface reflecting a light beam emitted from a given light source, the second axis intersecting with the first axis at approximately a right angle; (b) a main scanning unit driving the actuator part based on a first drive signal of a first frequency to cause the movable part to oscillate about the first axis, thereby scanning the light beam reflected off the reflecting surface in a main scanning direction of the raster scanning; and (c) a sub-scanning unit driving the actuator part based on a second drive signal of a second frequency to cause the movable part to oscillate about the second axis, thereby scanning the light beam reflected off the reflecting surface in a sub-scanning direction of the raster scanning. The main scanning unit includes a setting part for, out of specific frequencies calculated based on the second frequency, setting a frequency around a resonant frequency relevant to oscillatory motion of the movable part as the first frequency.

This facilitates the provision of a stable image display by beam raster scanning associated with resonant oscillations in the main scanning direction.

Preferably, in the image display apparatus, the specific frequencies are n times the second frequency (where n is a natural number).

This facilitates the determination of a proper first frequency.

It is thus an object of the invention to provide an image display apparatus that facilitates the provision of a stable image display by beam raster scanning accompanied with resonant oscillations in the main scanning direction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an external view of an image display apparatus according to a first preferred embodiment of the invention;

FIG. 9 is a block diagram of a configuration of the essential parts of a horizontal drive controller;

FIGS. 12A and 12B are diagrammatic illustrations of the operations of the image-signal controller;

FIG. 13 is a diagrammatic illustration of how to read out one horizontal line of data in one horizontal period;

FIGS. 14A and 14B are diagrammatic illustrations of candidates for a horizontal scanning frequency;

FIGS. 17A and 17B are diagrammatic illustrations of the operations of an image-signal controller in an image display apparatus according to a second preferred embodiment of the invention;

FIG. 18 is a diagrammatic illustration of candidates for the horizontal scanning frequency;

FIG. 19 is a diagrammatic illustration of the optical scanner in a different position;

DESCRIPTION OF THE PREFERRED EMBODIMENTS

First Preferred Embodiment

<Configuration of Image Display Apparatus>

FIG. 1 is an external view of an image display apparatus 100A according to a first preferred embodiment of the invention.

The image display apparatus 100A has a box-like shape and is configured as a projector that projects video (images) onto a screen 9. This image display apparatus 100A performs raster scanning RS of light beams emitted onto the screen 9 which is a plane of projection, thereby allowing a display of two-dimensional images on the screen 9. The raster scanning RS completes one image display by continuous scanning of light beams, for example from a start position Qa at the top of a displayed image to an end position Qb at the bottom of the displayed image. When the light beam scanning arrives at the position Qb, then vertical (and horizontal) scanning is performed for return to the position Qa in order for the next image display, during a vertical blanking interval where no image is displayed.

Figure 2:
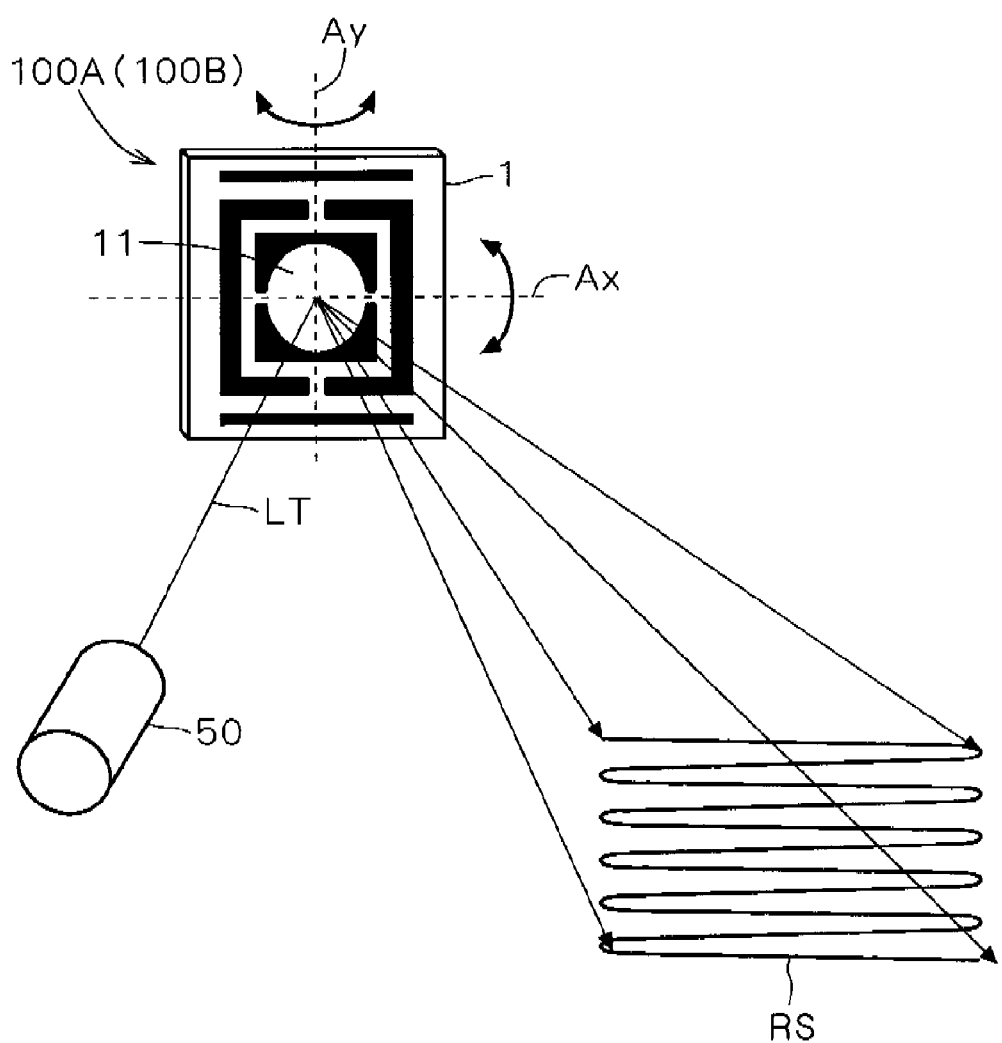
FIG. 2 is a diagrammatic illustration of the relative positions of an optical scanner and a light source.

The image display apparatus 100A is provided therein with an optical scanner 1 shown in FIG. 2 and a light source 50 emitting a light beam (e.g., a laser beam) LT toward the optical scanner 1.

The optical scanner 1 includes a mirror 11 that is rotatable about a first axis Ay parallel to the Y axis (cf. FIG. 6) and about a second axis Ax parallel to the X axis (cf. FIG. 6), the second axis Ax intersecting with the first axis Ay at approximately a right angle. Two-dimensional rotation of this mirror 11 about the first and second axes Ay and Ax allows the raster scanning RS of the light beam LT emitted from the light source 50 and reflected off the mirror 11. A concrete configuration of the optical scanner 1 is described later in detail.

Figure 3:
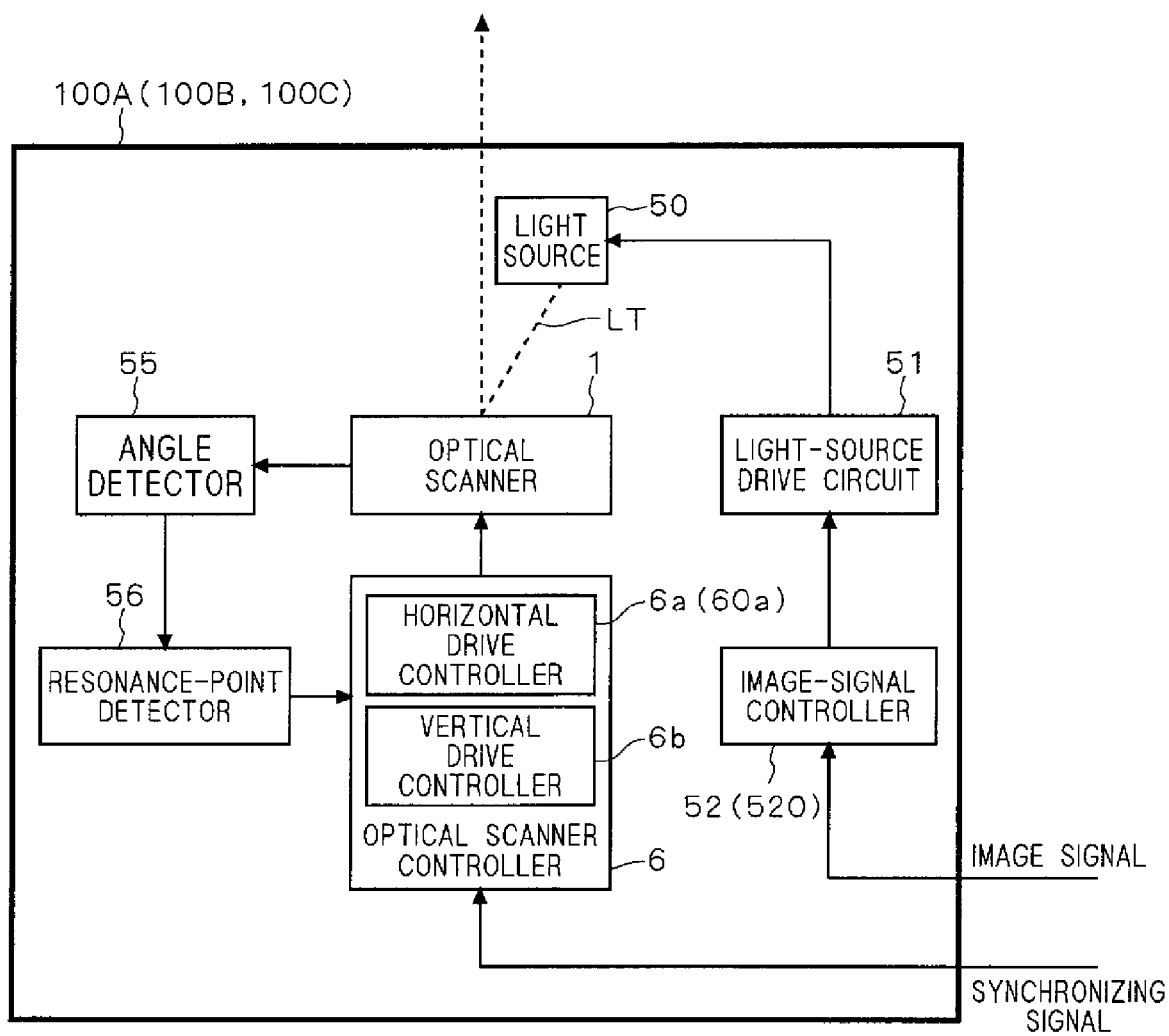
FIG. 3 is a block diagram showing a functional configuration of the image display apparatus.

FIG. 3 is a block diagram showing a functional configuration of the image display apparatus 100A.

The image display apparatus 100A includes, in addition to the optical scanner 1 and the light source 50 described above, an optical-scanner controller 6 performing drive control of the optical scanner 1; a light-source drive circuit 5 driving the light source 50, allowing modulation of the light beam LT; and an image-signal controller 52 controlling the light-source drive circuit 51.

The optical-scanner controller 6 includes a horizontal drive controller 6a controlling rotation of the mirror 11 about the first axis Ay (FIG. 2), i.e., horizontal drive; and a vertical drive controller 6b controlling rotation of the mirror 11 about the second axis Ax (FIG. 2), i.e., vertical drive. The horizontal drive controller 6a is described later in detail.

The image-signal controller 52 generates a control signal for controlling the light source 50, for example based on an image signal input from the outside of the image display apparatus 100A. Controlling, based on this control signal, the light source 50 (e.g., light on/off control or luminescence intensity control) through the light-source drive circuit 51 provides a proper image display based on an input image signal on the screen 9. The image-signal controller 52 is described later in detail.

The image display apparatus 100A further includes an angle detector 55 detecting the angle (displacement angle) of the mirror 11 that oscillates about the first axis Ay (FIG. 2); and a resonance-point detector 56 detecting a resonance point (resonant frequency) relevant to oscillatory motion of the mirror 11.

Figure 4:
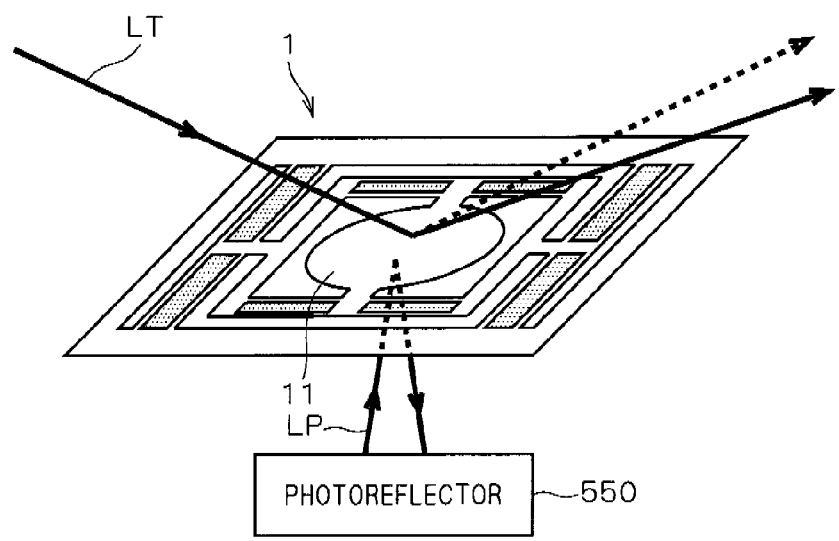
FIG. 4 is a diagrammatic illustration of how to detect the angle of a mirror with a photoreflector.

The angle detector 55 includes a photoreflector (PR) 550 shown in FIG. 4 as a position sensor. The photoreflector 550 detects the position of incidence of a light beam LP reflected off the back side Sb (described later) of the mirror 11, thereby detecting the angle of the mirror 11.

The angle detector 55 is capable of detecting the amplitude of the oscillating mirror 11 with information on the angle of the mirror 11 obtained from the photoreflector 550. Now the detection of the amplitude of the mirror 11 is described.

Figure 5:
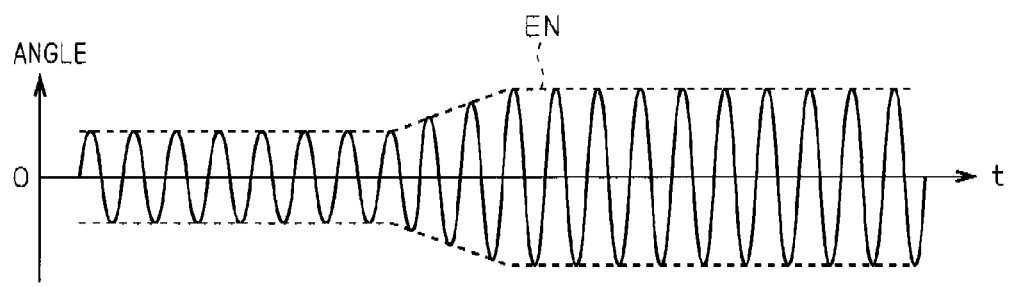
FIG. 5 is a diagrammatic illustration of how to detect the amplitude of a displacement angle of the mirror.

The displacement angle of the oscillating mirror 11 is expressed as a waveform of simple harmonic motion as shown in FIG. 5, and thus the envelopes EN (in broken lines) of that waveform represent the amplitude of the displacement angle of the mirror 11. From this, detection of the maximum amplitude in the envelopes EN with for example a peak detector, or demodulation of the envelopes EN with a detector circuit results in detection of the amplitude of the displacement angle of the mirror 11.

The angle detector 55 is also capable of detecting the phase of the oscillating mirror 11 with information on the angle of the mirror 11 obtained from the photoreflector 550. More specifically, the angle detector 55 detects a phase difference of a detection signal output from the photoreflector 550 relative to the phase of a drive signal generated from a horizontalscanning-frequency signal generator 63 (described later), thereby detecting the phase of the displacement angle of the mirror 11.

The resonance-point detector 56 detects a mechanical resonant frequency relevant to oscillatory motion of the mirror 11 based on the amplitude of the displacement angle of the mirror 11 or the phase of the mirror 11 detected from the angle detector 55. For example when drive signals of frequencies fp1 to fp3 and fm1 to fm3 (FIG. 14A), described later, are used in sequence to oscillate the mirror 11, the frequency at which the mirror 11 has the maximum amplitude of the displacement angle is determined as equivalent to the mechanical resonant frequency.

The following description is given of a configuration of the essential parts of the optical scanner 1.

<Configuration of Essential Parts of Optical Scanner 1>

Figure 6:
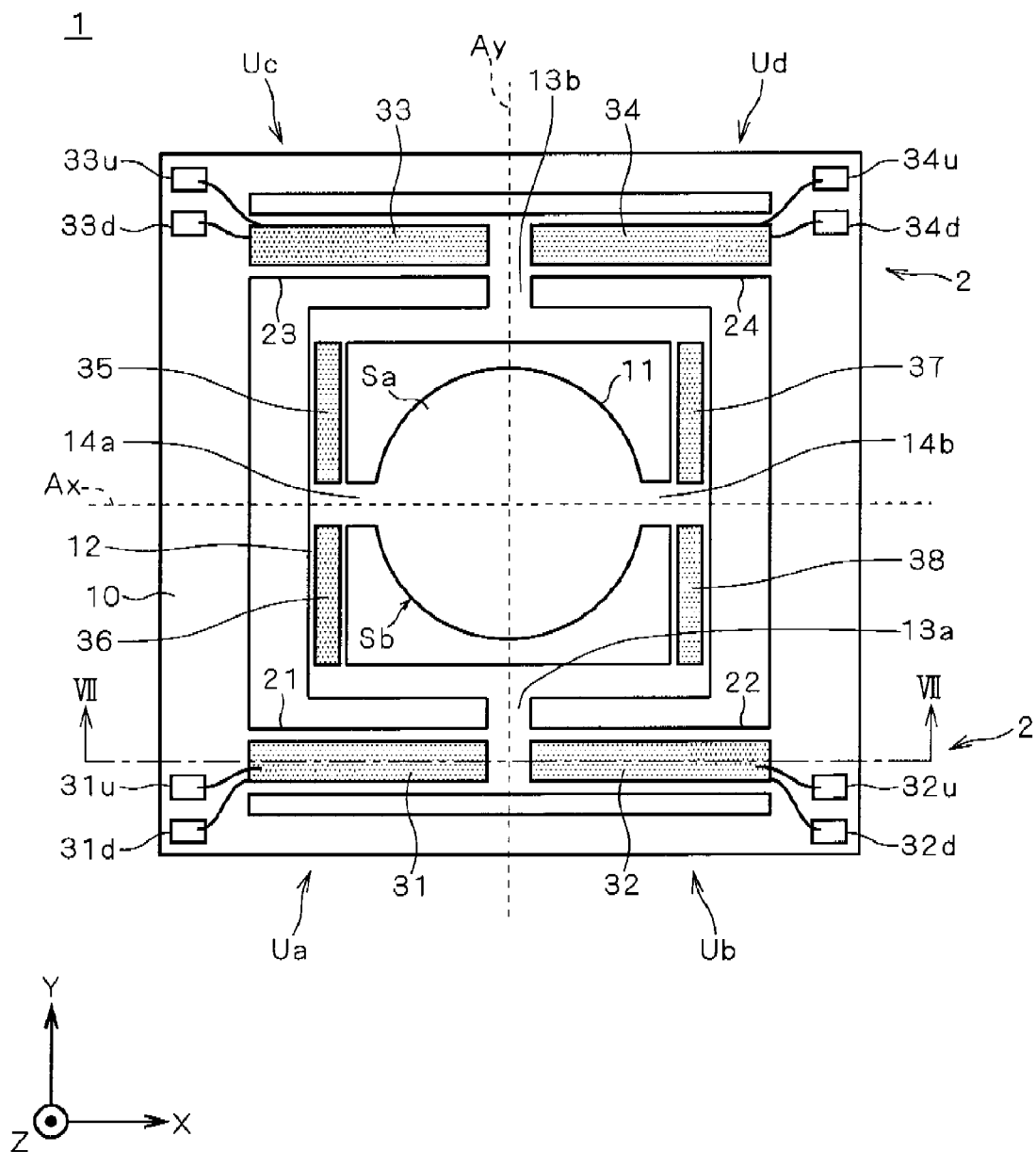
FIG. 6 is a plane view showing a configuration of the essential parts of the optical scanner.
Figure 7:
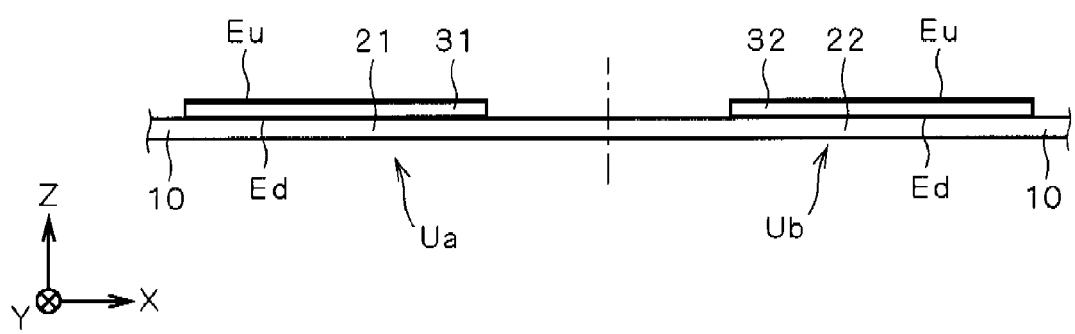
FIG. 7 is a cross-sectional view taken along line VII-VII in FIG. 6.

FIG. 6 is a plan view showing a configuration of the essential parts of the optical scanner 1. FIG. 7 is a cross-sectional view taken along line VII-VII in FIG. 6.

The optical scanner 1 includes a frame 10 of a hollow, square-shaped plate member fixed to a casing or the like, not shown; and a hollow, square-shaped holding member 12 contained in the frame 10 and resiliently holding the mirror 11. In the optical scanner 1, elastically deformable torsion bar parts 13 (13a, 13b) and 14 (14a, 14b) provide the coupling between the holding member 12 and the frame 10 through a vibrator 2 and the coupling between the mirror 11 and the holding member 12.

The mirror 11 has a disc-like shape, and its front and back sides Sa and Sb serve as reflecting surfaces reflecting a light beam LT emitted from the light source 50. Specifically, the mirror 11 has a reflection film of thin metal film, such as gold or aluminum (Al), formed on its front and back sides Sa and Sb, thereby improving its reflectance of incident light beams.

The torsion bar part 13 includes two torsion bars 13a and 13b extending from the holding member 12 to the vibrator 2 along the first axis Ay of the mirror 11, parallel to the Y axis. The presence of this torsion bar part 13 allows the holding member 12 holding the mirror 11 to be supported resiliently by the vibrator 2.

Similarly, the torsion bar part 14 includes two torsion bars 14a and 14b extending from both sides of the mirror 11 to the holding member 12 along the second axis Ax of the mirror 11, parallel to the X axis.

The vibrator 2 includes bending beams 21 and 22 of a plate member connected to the torsion bar 13a; and bending beams 23 and 24 of a plate member connected to the torsion bar 13b. These bending beams 21 to 24, the frame 10, the mirror 11, the holding member 12, and the torsion bars 13a, 13b, 14a, and 14b are integrally formed by anisotropic etching of, for example, a silicon substrate.

The vibrator 2 further includes piezoelectric elements 31 to 34 as electromechanical transducers attached to the upper surfaces of the bending beams 21 to 24, respectively, for example with an adhesive. The piezoelectric elements 31 to 34 are piezoelectric vibrators (piezoelectric actuators) causing the mirror 11 to oscillate about the first axis Ay. The piezoelectric elements 31 to 34 and the bending beams 21 to 24 form four unimorphs Ua, Ub, Uc, and Ud.

The piezoelectric elements 31 to 34 each have an upper electrode Eu and a lower electrode Ed on their front and back sides, respectively (FIG. 7). The upper electrodes Eu of the piezoelectric elements 31 to 34 are electrically connected respectively to electrode pads 31u to 34u provided on the frame 10, for example through wires; and the lower electrodes Ed of the piezoelectric elements 31 to 34 are electrically connected respectively to electrodes pads 31d to 34d provided on the frame 10, for example through wires. These electrode pads allow the application of drive voltage to each of the piezoelectric elements 31 to 34 from the outside of the optical scanner 1.

In the optical scanner 1 with the above-described configuration, the application of drive voltage to the piezoelectric elements 31 to 34 through the electrode pads 31u to 34u and 31d to 34d induces bending deformation of the bending beams 21 to 24. Such bending of the bending beams 21 to 24 gives the mirror 11 a rotary torque acting around the first axis Ay, through the torsion bars 13a and 13b and the holding member 12, thereby causing the mirror 11 as a movable part to oscillate about the first axis Ay. This oscillatory motion of the mirror 11 is now described in detail.

Figure 8A:
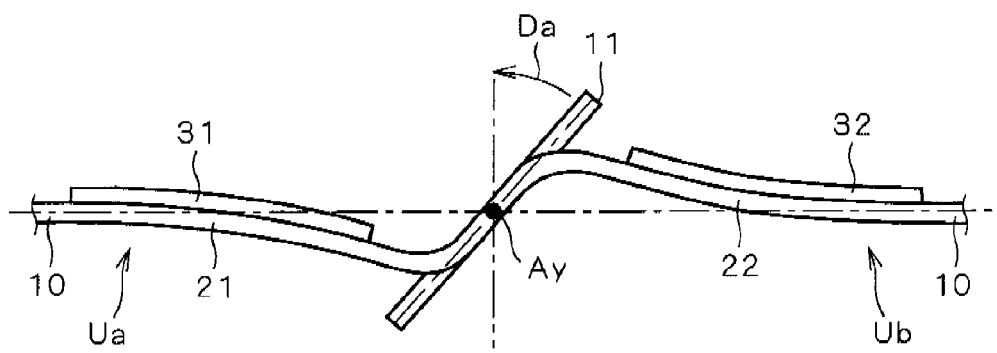
FIGS. 8A and 8B are diagrammatic illustrations of oscillatory motion of the mirror.
Figure 8B:
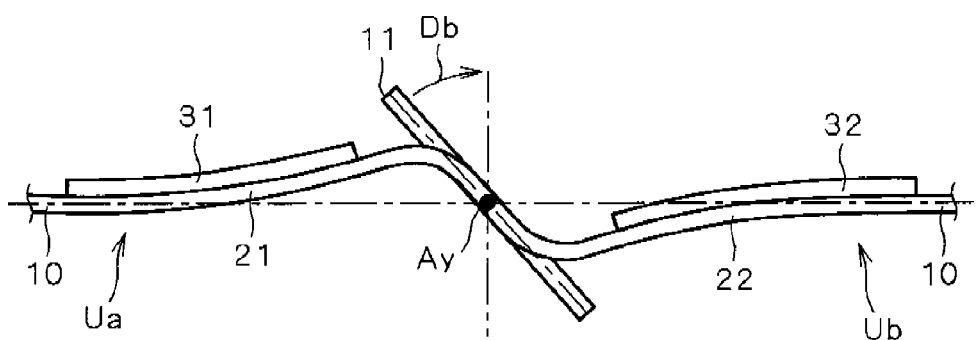

FIGS. 8A and 8B are diagrammatic illustrations of the oscillatory motion of the mirror 11 and correspond to FIG. 7 showing a cross-section when viewed from the position of the line VII-VII in FIG. 6. For convenience of description, the holding member 12 is not shown in FIGS. 8A and 8B.

In the optical scanner 1, the piezoelectric elements 31 to 34 undergo contraction and unimorph deformation in the direction of their thicknesses with application of alternating voltage in such a range as not to cause polarization inversion between their upper and lower electrodes Eu and Ed.

With this in view, a drive voltage causing the piezoelectric element 31 to extend along its length (in the X-axis direction) is applied to the piezoelectric element 31; and a drive voltage opposite in phase to that applied to the piezoelectric element 31 is applied to the piezoelectric element 32 to cause contraction of the piezoelectric element 32. This causes the bending beams 21 and 22 in the unimorphs Ua and Ub, with their one ends coupled to the frame 10, to bend downward and upward, respectively, as shown in FIG. 8A. Similarly, drive voltages of the same phases as applied to the piezoelectric elements 31 and 32 are applied respectively to the piezoelectric elements 33 and 34, thereby causing the bending beams 23 and 24 to bend downward and upward, respectively. This gives the mirror 11 a rotary torque acting around the first axis Ay, through the torsion bars 13a and 13b, causing the mirror 11 to tilt in a direction Da relative to the first axis Ay as shown in FIG. 8A.

On the other hand, a drive voltage causing the piezoelectric element 32 to extend along its length (in the X-axis direction) is applied to the piezoelectric element 32; and a drive voltage opposite in phase to that applied to the piezoelectric element 32 is applied to the piezoelectric element 31 to cause contraction of the piezoelectric element 31. This causes the bending beams 21 and 22 in the unimorphs Ua and Ub, with their one ends coupled to the frame 10, to bend upward and downward, respectively, as shown in FIG. 8B. Similarly, drive voltages of the same phases as applied to the piezoelectric elements 31 and 32 are applied respectively to the piezoelectric elements 33 and 34, thereby causing the bending beams 23 and 24 to bend upward and downward, respectively. This gives the mirror 11 a rotary torque acting around the first axis Ay, through the torsion bars 13a and 13b, causing the mirror 11 to tilt in a direction of rotation Db relative to the first axis Ay as shown in FIG. 8B.

In this way, the application of alternating drive voltages to the piezoelectric elements 31 to 34 to cause the mirror 11 to turn in the directions Da and Db (FIGS. 8A and 8B) results in repetitive upward and downward oscillations of the unimorphs Ua to Ud, which oscillations follow the voltages applied. This produces a seesaw-like rotary torque in the torsion bars 13a and 13b, causing the mirror 11 to oscillate through the holding member 12 in a given range of angle. In other words, driving the piezoelectric elements 31 to 34 based on a drive signal (cf. FIG. 10) of a horizontal scanning frequency (first frequency) and thereby causing the mirror 11 to oscillate about the first axis Ay allows scanning of the light beam LT, reflected off the reflecting surface of the mirror 11, in the horizontal direction (the main scanning direction) of the raster scanning RS (FIG. 2).

For cases where the oscillation angle of the mirror 11 is small, the alternating voltages applied to the piezoelectric elements 31 to 34 are made to have a frequency equivalent to the resonant frequency of a mechanical oscillating system in the optical scanner 1. This induces resonant oscillations of the mirror 11, achieving a large angle of deviation (the angle of optical scanning) for the optical scanner 1.

The optical scanner 1, as shown in FIG. 6, further includes four piezoelectric elements (piezoelectric actuators) 35 to 38 on the holding member 12 in a one-to-one correspondence with the piezoelectric elements 31 to 34, respectively. The presence of these four allows the mirror 11 to oscillate about the second axis Ax in the same way as it oscillates about the first axis Ay. In other words, driving the piezoelectric elements 35 to 38 on the holding member 12 and thereby causing the mirror 11 to oscillate about the second axis Ax allows scanning of a light beam, reflected off the reflecting surface of the mirror 11, in the vertical direction (the sub-scanning direction) of the raster scanning RS (FIG. 1). The piezoelectric elements 35 to 38 capable of causing the mirror 11 to oscillate about the second axis Ax, and the piezoelectric elements 31 to 34 capable of causing the mirror 11 to oscillate about the first axis Ay, as described above, constitute an actuator part necessary for the beam raster scanning RS.

The description below is given of a horizontal drive controller 6a for driving the mirror 11 of the optical scanner 1 in the horizontal direction (about the first axis Ay) at the frequency of mechanical resonance of the optical scanner 1.

<Horizontal Drive Controller 6a>

FIG. 9 is a block diagram showing a configuration of the essential parts of the horizontal drive controller 6a.

The horizontal drive controller 6a includes the horizontal drive circuit 61 driving the optical scanner 1 in the horizontal direction (about the first axis Ay) with application of voltage to the piezoelectric elements 31 to 34; a horizontal-readout-frequency setting part 62; and a horizontal-scanning-frequency signal generator 63.

The horizontal-readout-frequency setting part 62 sets a horizontal readout frequency frh (described later) based on the mechanical resonant frequency detected in the resonance-point detector 56 with the displacement angle of the mirror 11 detected in the angle detector 55. Information on this horizontal readout frequency frh set in the horizontal-readout-frequency setting part 62 is fed to the horizontal-scanning-frequency signal generator 63.

Figure 10:
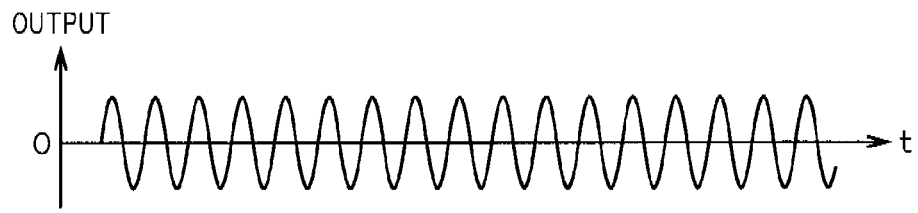
FIG. 10 is a diagrammatic illustration of a drive signal output from a horizontal-scanning-frequency signal generator.

The horizontal-scanning-frequency signal generator 63 outputs a drive signal of simple harmonic motion, for example as shown in FIG. 10, for horizontal drive of the optical scanner 1. This drive signal is a signal repeated at, for example, a frequency equivalent to half the horizontal readout frequency frh set in the horizontal-readout-frequency setting part 62, and it has a frequency component around the mechanical resonant frequency of oscillatory motion of the mirror 11.

In order to fix the raster scanning RS of the light beam LT with the optical scanner 1 for every image display, the relationship between a horizontal synchronizing frequency fh of an image signal, which is set in the horizontal-readout-frequency setting part 62, and a vertical synchronizing frequency fv of the image signal needs to satisfy the following equation (1), where n (n is an integer) is the number of horizontal scanning lines (the number of lines).

$$fh = fv \cdot n \quad (1)$$

For example for image display according to the XGA standard (display pixels: 1024×768 pixels; total horizontal pixels: 1344 pixels), if the vertical synchronizing frequency fv is 60 Hz and the number of horizontal scanning lines, n, is 806 (out of which the number of image display lines, q, is 768), the above equation (1) yields the horizontal synchronizing frequency fh of 48.36 kHz.

<Image-Signal Controller 52>

The image display apparatus 100A performs reciprocating image displays in the raster scanning RS in the horizontal direction, in order to ensure the brightness of the display screen while keeping the output of the light source 50 to the minimum requirement. Described below is a configuration of the image-signal controller 52 required for such reciprocating image displays.

Figure 11:
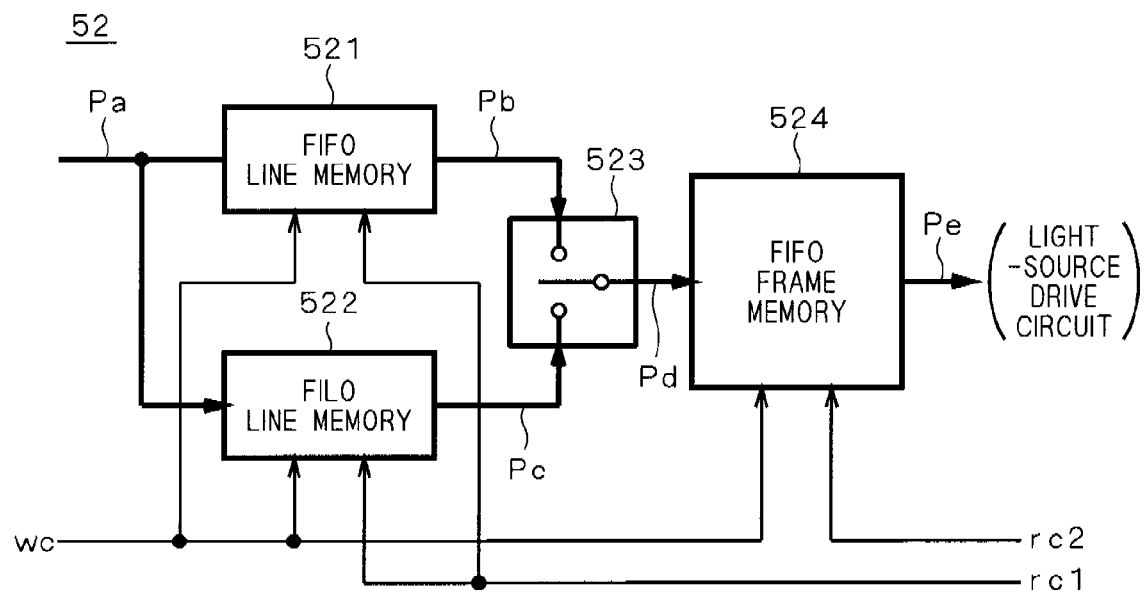
FIG. 11 is a diagrammatic illustration of a configuration of the essential parts of an image-signal controller.

FIG. 11 is a diagrammatic illustration of a configuration of the essential parts of the image-signal controller 52. The thick lines in FIG. 11 are flows of image signals.

The image-signal controller 52 includes a FIFO (first-in fast-out) line memory 521; a FILO (first-in last-out) line memory 522; a selector switch 523; and a FIFO frame memory 524.

The FIFO line memory 521 outputs one horizontal line of image data from an image signal (hereinafter also referred to as an "input image data"), which is for example input from the outside, with a delay of one horizontal period (=the reciprocal of the horizontal readout frequency frh).

On the other hand, the FILO line memory 522 sorts one horizontal line of input image data in reverse order and outputs resultant data with a delay of one horizontal period.

While switching between the FIFO line memory 521 and the FILO line memory 522 every one horizontal period, the selector switch 523 outputs one horizontal line of image data, which is output from the FIFO line memory 521 or the FILO line memory 522, to the FIFO frame memory 524.

The FIFO frame memory 524 is capable of storing one frame of input image data. Upon completion of accumulation of each horizontal line of image data from the selector switch 523 to form one frame, the FIFO frame memory 524 outputs the stored one frame of image data to the light-source drive circuit 51.

The operation of the image-signal controller 52 with the above-described configuration is now described below.

FIGS. 12A and 12B are diagrammatic illustrations of the operations of the image-signal controller 52. FIGS. 12A and 12B show changes in data (data flows) with time. FIG. 12A shows a flow of image data at points Pa to Pd in FIG. 11 on a horizontal line basis; and FIG. 12B shows a flow of image data at points Pd and Pe in FIG. 11 on a frame basis. In FIG. 12A, the reference characters "A" and "B" designate respectively odd- and even-numbered horizontal lines; the reference numerals "1" to "403" attached to "A" and "B" designate the line numbers of the odd- and even-numbered lines; and the minus sign "−" before the reference characters indicates that the one horizontal line of image data is sorted in reverse order in the FILO line memory 522. In FIG. 12B, the reference character "F" designates one frame of image data (image frame); and the reference numerals "1" to "3" attached to "F" designate the frame number.

At point Pa, a data row in sequential order on a horizontal line basis is formed based on input image data fed to the image-signal controller 52.

At point Pb, one horizontal line of input image data is written into the FIFO line memory 521 at a write clock wc (FIG. 11), e.g., at a frequency of 65 MHz (=the horizontal synchronizing frequency fh (48.36 kHz)×total horizontal pixels (1344 pixels)), and then is read out at a read clock rc1 (FIG. 11) of the same frequency as the write clock wc, during the next one horizontal period. This forms a data row of odd-numbered lines of image data with a delay of one horizontal period relative to the data row at point Pa.

At point Pc, one horizontal line of input image data is written into the FILO line memory 522 at the write clock wc (FIG. 11) and then is read out at the read clock rc1 (FIG. 11) of the same frequency as the write clock wc, during the next one horizontal period. This forms a data row of even-numbered lines of image data, each line of data being sorted in reverse order, with a delay of one horizontal period relative to the data row at the point Pa.

At point Pd, the selector switch 523 switches between the above-described data rows at points Pb and Pc on a horizontal line basis, i.e., on a horizontal period basis, to form a data row. The resultant data row, with a delay of one horizontal period relative to the data row at point Pa and with each even-numbered line of data sorted in reverse order, is written into the FIFO frame memory 524 at the write clock wc (FIG. 11).

At point Pe, the image frame stored in the FIFO frame memory 524 is read out at a read clock rc2 (FIG. 11) during the next vertical period, to form a data row for that image frame as shown in FIG. 12B, with a delay of one vertical period relative to the data row at point Pd. In the present case, the read clock rc2 is set to have a frequency equal to or higher than the write clock wc described above. This enables parallel operations, namely the readout of an image frame from the FIFO frame memory 524 and the storage of the next image frame into the FIFO frame memory 524, thereby allowing the FIFO frame memory 524 to continuously output data rows for image frames with a delay of one vertical period. In such readout of image frames from the FIFO frame memory 524 at the read clock rc2, one horizontal line of image data is read out and displayed at high speed during one horizontal-line display period Thr that falls within one horizontal period Th as shown in FIG. 13. This allows a stable image display.

The read clock rc2 described above may be generated in the image-signal controller 52 that includes the FIFO frame memory 524, and unlike in conventional methods, it is not necessary to generate, as a read clock, a clock signal synchronized with the mechanical resonant frequency with a PLL circuit or the like.

Through the operation described above, the image-signal controller 52 outputs an image frame with its horizontal lines of image data sorted in reverse order every two lines. Based on this image frame, the light-source drive circuit 51 then modulates the light beam LT emitted from the light source 50, thereby allowing proper reciprocating image display in the raster scanning RS in the horizontal direction.

<Operation of Horizontal-Readout-Frequency Setting Part 62>

The horizontal-readout-frequency setting part 62 in the horizontal drive controller 6a performs the operation of setting the horizontal readout frequency frh obtained from the horizontal scanning frequency, which is selected based on the mechanical resonant frequency detected in the resonance-point detector 56. This is now described in detail below.

In order to fix the raster scanning RS of the light beam LT with the optical scanner 1, i.e., in order to overlay the scanning lines of sequentially displayed images one after another, in general cases of one-way image display by horizontal scanning, the horizontal readout frequency frh needs to satisfy the following equation (2), where, as in the equation (1) given above, fv is the vertical synchronizing frequency and m is the number of horizontal scanning lines (the number of lines) (m is an integer equal to or larger than the number of image display lines, q).

$$frh = fv \cdot m \qquad (2)$$

However, since the image display apparatus 100A according to this preferred embodiment provides reciprocating image display by horizontal scanning (which scanning is hereinafter referred to also as "reciprocating-display scanning"), a horizontal scanning frequency fmhd, which is the frequency of oscillatory motion of the optical scanner 1 in the horizontal scanning direction, is half the horizontal readout frequency frh as expressed by the following equation (3).

$$fmhd = fv \cdot m/2 \qquad (3)$$

Substituting the equation (2) into the above equation (3) yields the following equation (4).

$$fmhd = fv \cdot m/2 \qquad (4)$$

Here, in order to match the scanning line position and the scanning direction between images displayed by reciprocating-display scanning, the number of horizontal scanning lines, m, must be an even number, and the following equation (5) thus holds.

$$m = 2p \qquad (5)$$

where p is an integer.

Substituting the above equation (5) into the equation (4) given above yields the following equation (6).

$$fmhd = fv \cdot p \qquad (6)$$

Hence, in the image display apparatus 100A performing the reciprocating-display scanning, a horizontal scanning frequency around the mechanical resonant frequency of the optical scanner 1, for example, could be selected from candidates for the horizontal scanning frequency fmhd, which candidates satisfy the condition expressed by the equation (6) given above, i.e., which candidates are n times the vertical synchronizing frequency fv (where n is a natural number). This allows a stable image display by the raster scanning RS. The detail thereof is now described below.

FIGS. 14A and 14B are diagrammatic illustrations of the candidates for the horizontal scanning frequency. In FIGS. 14A and 14B, the horizontal axes represent the frequency; and the vertical axes represent the amplitude and phase, respectively, of the output of optical scanning with the optical scanner 1. The mechanical resonant frequency of the optical scanner 1 is designated by "f0" in FIGS. 14A and 14B.

The horizontal scanning frequency fmhd, satisfying the equation (6) given above, includes, for example as shown in FIG. 14A, the first frequency fp1, the second frequency fp2, the third frequency fp3, and so on in the direction of increasing frequency from the mechanical resonant frequency f0; and the first frequency fm1, the second frequency fm2, the third frequency fm3, and so on in the direction of decreasing frequency from the mechanical resonant frequency f0. These frequencies are the candidates for the frequency (the horizontal scanning frequency) of a drive signal generated in the horizontal-scanning-frequency signal generator 63. In other words, selecting one horizontal scanning frequency fmhd from the candidate frequencies fp1 to fp4 and fm1 to fm3 around the mechanical resonant frequency f0 allows a stable image display.

Described below are three techniques (1) to (3) for selecting the horizontal scanning frequency fmhd for use in setting the horizontal readout frequency frh in the horizontal-readout-frequency setting part 62, out of the frequencies fp1 to fp4 and fm1 to fm3 in FIG. 14, with information on the mechanical resonant frequency f0 obtained from the resonance-point detector 56.

(1) Selection of Frequency Nearest to Mechanical Resonant Frequency

The horizontal scanning frequency is selected, which is the nearest one to the mechanical resonant frequency f0 detected in the resonance-point detector 56. For example in the case of FIG. 14A, the frequency fp1 in close proximity to the mechanical resonant frequency f0 is selected as the horizontal scanning frequency fmhd. In this way, out of the specific frequencies fp1 to fp4 and fm1 to fm3 calculated from the above equation (6) based on the vertical synchronizing frequency (vertical scanning frequency) fv, a frequency around the mechanical resonant frequency f0, more specifically the frequency nearest to the mechanical resonant frequency f0, is set as the horizontal scanning frequency. This induces general resonant oscillations of the mirror 11, achieving a greater amplitude of output of optical scanning in the horizontal direction.

(2) Selection of Frequency within Frequency Band Defined by Quality Factor Q

The horizontal scanning frequency fmhd is selected from a group of frequencies within a −3 dB frequency passband fbw defined by the quality factor Q relevant to a resonance characteristic Gf having the mechanical resonant frequency f0. For example in the case of FIG. 14A, the horizontal scanning frequency fmhd is selected out of five frequencies fm2, fm1, fp1, fp2, and fp3.

Selecting in this way the horizontal scanning frequency fmhd from a frequency group within the frequency band fbw provides a relatively sufficient output of optical scanning with its decrease in amplitude within a range of about 30% with respect to the output of optical scanning at the mechanical resonant frequency f0. Such a decrease in amplitude within 30% could be compensated for, for example by increasing the gain in the horizontal drive circuit 61.

For example when the mechanical resonant frequency f0 detected in the resonance-point detector 56 is 31 kHz and the quality factor Q described above is 100, the −3 dB frequency passband fbw (Hz) is calculated as follow:

$$fbw=f0/Q=31000/100=310(Hz).$$

If the vertical synchronizing frequency fv is 60 Hz, five frequencies from fm2 =515 fv (30.9 kHz) to fp3=519 fv (31.14 kHz) in FIG. 14A become the candidates for the horizontal scanning frequency fmhd. Here, if the frequency fp1=517 fv, the horizontal-readout-frequency setting part 62 sets the horizontal readout frequency frh of 62.04 kHz (=517× 60×2 Hz).

As described above, out of specific frequencies calculated from the above equation (6) based on the vertical synchronizing frequency (vertical scanning frequency) fv, the frequency around the mechanical resonant frequency f0 is set as the horizontal scanning frequency. This induces general resonant oscillations of the mirror 11, achieving a greater amplitude of output of optical scanning in the horizontal direction.

It must be known that the frequency band fbw including candidates for the horizontal scanning frequency is not always necessarily determined based on the quality factor Q, and instead, another frequency band may be adopted, which is within a range of decrease in the output of optical scanning that the horizontal drive circuit 61 can compensate for.

(3) Selection of Frequency Keeping Approximately the Same Phase

In the technique (1) described above, the frequency nearest to the mechanical resonant frequency f0 detected in the resonance-point detector 56 is selected as the horizontal scanning frequency fmhd; however, at a frequency that is too close to the mechanical resonant frequency f0, a drastic change (180 degrees at the maximum) in the phase of the output of optical scanning as shown in FIG. 14B can occur with fluctuations in the mechanical resonant frequency f0 with environmental changes (such as temperature) or with time. This results in disturbance of a displayed image.

To overcome such imperfections, the horizontal scanning frequency fmhd with approximately the same phase is selected according to the result of phase detection based on the displacement angle of the mirror 11 detected in the angle detector 55. For example, the horizontal scanning frequency fmhd is selected at any time out of frequencies belonging to a frequency band UP higher than the mechanical resonant frequency f0. Or, the horizontal scanning frequency fmhd is selected at any time out of frequencies belonging to a frequency band DN lower than the mechanical resonant frequency f0.

In other words, in order to change the horizontal scanning frequency fmhd with variations in the mechanical resonant frequency f0 detected in the resonance-point detector 56, the phase of the oscillation angle of the mirror 11 for each drive signal repeated at the horizontal scanning frequency fmhd is made to remain approximately the same before and after the change of the horizontal scanning frequency fmhd. This results in a more stable image display even with fluctuations in the mechanical resonant frequency f0 due to a temperature change or the like.

The selection of the horizontal scanning frequency fmhd described above is made using information on the mechanical resonant frequency f0 detected in the resonance-point detector 56. Now, the detection of this mechanical resonant frequency f0 is described in detail below.

<Detection of Mechanical Resonant Frequency>

For the detection of the mechanical resonant frequency f0 in the resonance-point detector 56, the horizontal scanning frequency fmhd satisfying the above equation (6) sweeps in sequence (e.g., in the case of FIG. 14A, in the sequence of fm3, fm2, fm1, fp1, and so on) in order to observe the displacement angle of the mirror 11 detected in the angle detector 55. For example, since it is known beforehand that the amplitude of the output of optical scanning shows a single-humped resonance characteristic Gf with a peak at the mechanical resonant frequency f0 as shown in FIG. 14A, if such a single-humped resonance characteristic Gf as described above is observed after the amplitude of the output of optical scanning is stored every time the frequency shifts the vertical synchronizing frequency fv at a time, the horizontal scanning frequency fmhd which corresponds to the peak (the maximum amplitude value) of that characteristic curve can be determined as equivalent to the mechanical resonant frequency f0. This method of detecting the mechanical resonant frequency f0 is so called "a hill-climbing detection method," in which the quality factor Q of the resonance characteristic Gf relevant to the mirror 11 is generally a high numerical value (e.g., 100 or higher), so that relatively high-precision detection is possible. Such detection of the mechanical resonance frequency f0, when taking a long time, may be conducted at power-on of the image display apparatus 100A (at a preparatory stage).

As described above, the horizontal-scanning-frequency signal generator 63 generates drive signals of a plurality of frequencies calculated based on the vertical synchronizing frequency fv; and based on each of the drive signals, the piezoelectric elements 31 to 34 are driven to cause the mirror 11 to oscillate around the first axis Ay. Then, the amplitude of the oscillation angle of the mirror 11 for each drive signal is compared in order to detect a frequency corresponding to the mechanical resonant frequency f0. This allows efficient detection of the mechanical resonant frequency f0.

For detection of the mechanical resonant frequency f0 in the resonance-point detector 56, another method by comparison of the phase of the output of the optical scanning may be employed, other than the above-described method by comparison of the amplitude of the output of the optical scanning. Specifically, since, as described above, the quality factor Q of the resonance characteristic Gf relevant to the mirror 11 is generally a high numerical value, the phase of the output of optical scanning will make a sudden change (180 degrees at the maximum) around the mechanical resonant frequency f0 as shown in FIG. 14B. This sudden phase change can be utilized for the detection of the mechanical resonant frequency f0.

More specifically, if a sudden phase change (e.g., a phase change greater than a previously given threshold value) is observed after the phase of the output of optical scanning is stored every time the horizontal scanning frequency fmhd, which satisfies the above equation (6), shifts the vertical synchronizing frequency fv at a time, the horizontal scanning frequency fmhd at which the sudden change occurs can be determined as equivalent to the mechanical resonant frequency f0.

As described above, the horizontal-scanning-frequency signal generator 63 generates drive signals of a plurality of frequencies calculated based on the vertical synchronizing frequency fv; and based on each of the drive signals, the piezoelectric elements 31 to 34 are driven to cause the mirror 11 to oscillate around the first axis Ay. Then, the phase of the oscillation angle of the mirror 11 for each drive signal is compared in order to detect a frequency corresponding to the mechanical resonant frequency f0. This allows efficient detection of the mechanical resonant frequency f0.

In this way, the resonance-point detector 56 detects the mechanical resonant frequency f0, which is the frequency calculated based on the vertical synchronizing frequency fv; and based on the detected frequency and using any one of the techniques (1) to (3) described above, the horizontal scanning frequency fmhd is selected. This allows the horizontal-scanning-frequency signal generator 63 to generate a proper drive signal, thereby allowing a stable image display.

Here, in detecting the mechanical resonant frequency f0 during operation of image display in the image display apparatus 100A, the frequency is shifted by only the vertical synchronizing frequency fv before and after the currently in-use mechanical resonant frequency f0 because it is expected that no considerable variation occurs from the currently in-use mechanical resonant frequency f0 which has already been detected in the resonance-point detector 56. If the amplitudes of the output of optical scanning at frequencies before and after the currently in-use mechanical resonant frequency f0 are greater than the amplitude at the currently in-use mechanical resonant frequency f0, it is determined that the mechanical resonant frequency f0 has shifted in a direction of increasing frequency amplitude.

Then, the frequency sweeps the vertical synchronizing frequency fv at a time in the direction of increasing frequency amplitude, in order to observe a change in the amplitude of the output of optical scanning. When the change in amplitude becomes equal to or smaller than a previously given threshold value, it is determined that the frequency is the nearest to the mechanical resonant frequency f0, and accordingly, the sweeping of the frequency is stopped and the frequency at that point in time is determined as the mechanical resonant frequency f0.

The detection of the mechanical resonant frequency f0 may be conducted during a vertical blanking interval. In this case also, the frequency is shifted by only the vertical synchronizing frequency fv before and after the currently in-use mechanical resonant frequency f0; and if the amplitudes of the output of optical scanning at frequencies before and after the currently in-use mechanical resonant frequency f0 are greater than the amplitude at the currently in-use mechanical resonant frequency f0, it is determined that the frequency has shifted in the direction of increasing frequency amplitude. Then, the frequency sweeps the vertical synchronizing frequency fv at a time in the direction of increasing frequency amplitude, in order to observe a change in the amplitude of the output of optical scanning. When the change in amplitude becomes equal to or smaller than a previously given threshold value, it is determined that the frequency is the nearest to the mechanical resonant frequency; and accordingly, the sweeping of the frequency is stopped and the frequency at that point in time is determined as the mechanical resonant frequency f0. Such detection of the mechanical resonant frequency f0, when taking a long time, may be conducted over a plurality of vertical blanking intervals, instead of a single vertical blanking interval.

A change in the horizontal scanning frequency fmhd with a change in the mechanical resonant frequency f0, on the other hand, causes a slight change in horizontal and vertical scan widths of the raster scanning RS.

In this case, for a change in the horizontal scan width, the output (e.g., gain) of the horizontal drive circuit 61 may be controlled based on a change in the displacement angle of the mirror 11 detected in the angle detector 55 so that the amplitude of oscillatory motion of the mirror 11 becomes equivalent to a previously given value (target value). For a change in the vertical scan width, for example a gain G of a vertical drive circuit (not shown) in the vertical drive controller 6b is varied for output control at the same time as changing the horizontal scanning frequency fmhd, as will be described below, so that the vertical scan width becomes equivalent to a previously given value (target value). Such control over changes in the horizontal and vertical scan widths as described above makes it possible to keep constant both the size and the aspect ratio of a displayed image.

Where p1 is the integer p relative to the horizontal scanning frequency fmhd before change in the above equation (6); and p2 is the integer p relative to the horizontal scanning frequency fmhd after change, and if the vertical scan width remains unchanged before and after the change of the horizontal scanning frequency fmhd, the following equation (7) holds:

$$q \cdot G1/(2p1) = q \cdot G2/(2p2) \quad (7)$$

where q is the number of effective lines in image display (e.g., 768 in the case of XGA); and G1 and G2 are the gain G of the vertical drive circuit before and after the change of the horizontal scanning frequency fmhd.

Transforming the equation (7) given above yields the following equation (8):

$$G2/G1 = p2/p1 \quad (8)$$

Controlling the gain G of the vertical drive circuit in the vertical drive controller 6b based on the above equation (8) keeps the vertical scan width unchanged before and after the change of the horizontal scanning frequency fmhd.

In the case where the mechanical resonance characteristic changes with variations in the mechanical resonant frequency f0 due to environmental changes (such as a temperature change) during the raster scanning RS, the aspect ratio of a displayed image will change because of varying horizontal scan width during the raster scanning RS. In this case, if the output of the horizontal drive circuit 61 can be controlled, for example by changing the gain, based on variations in the angle of the mirror 11 detected in the angle detector 55, so that the amplitude of oscillatory motion of the mirror 11 becomes equivalent to a previously given value (target value), it becomes possible to prevent variations in the aspect ratio of a displayed image.

Through the operation described above, the image display apparatus 100A determines a frequency that satisfies the equation (6) described above and that is around the mechanical resonant frequency f0, as the horizontal scanning frequency fmhd, thereby readily keeping an image signal of a displayed image synchronized with the raster scanning. This results in a stable image display.

The image display apparatus 100A does not necessarily have to perform horizontal scanning (reciprocating-display scanning) of the raster scanning RS associated with reciprocating image display, and instead, it may perform horizontal scanning of the raster scanning RS associated with one-way image display (which scanning is hereinafter referred to also as one-way display scanning).

In the case of one-way display scanning, instead of the horizontal scanning frequency fmhd defined by the equation (6) given above for the reciprocating-display scanning, a horizontal scanning frequency fmhs is set, which is equal to the horizontal readout frequency frh as expressed by the following equation (9):

$$fmhs = frh \tag{9}$$

Substituting the equation (2) given above into the above equation (9) yields the following equation (10).

$$fmhs = fv \cdot m \tag{10}$$

where fv is the vertical synchronizing frequency; and m is the number of horizontal scanning lines (the number of lines).

From the above, in the one-way display scanning, if a horizontal scanning frequency around the mechanical resonant frequency of the optical scanner 1 is selected from candidates for the horizontal scanning frequency fmhs that satisfies the condition expressed by the equation (10) given above, a stable image display can be achieved by the raster scanning RS. The detail thereof is now described below.

Figure 15:
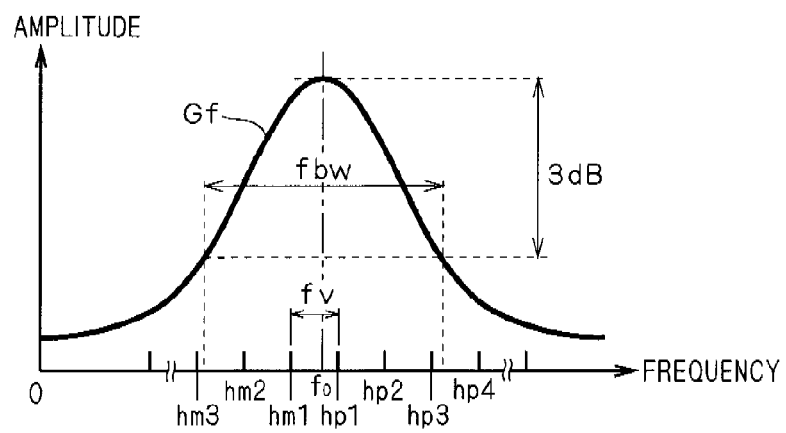
FIG. 15 is a diagrammatic illustration of candidates for the horizontal scanning frequency in one-way display scanning.

FIG. 15 is a diagrammatic illustration of candidates for the horizontal scanning frequency in the one-way display scanning. FIG. 15 corresponds to FIG. 14A, and its horizontal axis represents the frequency and its vertical axis represents the amplitude of the output of optical scanning with the optical scanner 1. The mechanical resonant frequency of the optical scanner 1 is represented by "f0" in FIG. 15.

The horizontal scanning frequency fmhs, satisfying the equation (10) given above, includes, for example as shown in FIG. 15, the first frequency hp1, the second frequency hp2, the third frequency hp3, and so on in the direction of increasing frequency from the mechanical resonant frequency f0; and the first frequency hm1, the second frequency hm2, the third frequency hm3, and so on in the direction of decreasing frequency from the mechanical resonant frequency f0. These frequencies are to be candidates for the frequency (horizontal scanning frequency) of a drive signal generated in the horizontal-scanning-frequency signal generator 63. In other words, selecting one horizontal scanning frequency fmhs from the candidate frequencies hp1 to hp4 and hm1 to hm3 around the mechanical resonant frequency f0 allows a stable image display.

For the selection of the horizontal scanning frequency fmhs, any one of the above-described techniques (1) to (3) used in the reciprocating-display scanning can be employed.

In the one-way display scanning, the resonance-point detector 56 adopts the above-described method of detecting the mechanical resonant frequency in the reciprocating-display scanning, in which the horizontal scanning frequency fmhs satisfying the equation (10) described above sweeps in sequence (e.g., in the case of FIG. 15, in the sequence of hm3, hm2, hm1, hp1, and so on), for efficient detection of the mechanical resonant frequency f0.

Varying the horizontal scanning frequency fmhd with a change in the mechanical resonant frequency f0, on the other hand, causes slight changes in the horizontal and vertical scan widths of the raster scanning RS.

In this case, for a change in the horizontal scan width, as in the case of the reciprocating-display scanning, the output of the horizontal drive circuit 61 may be controlled based on a change in the displacement angle of the mirror 11 detected in the angle detector 55 so that the amplitude of oscillatory motion of the mirror 11 becomes equivalent to a previously given value (target value). For a change in the vertical scan width, for example a gain G of a vertical drive circuit (not shown) in the vertical drive controller 6b is varied for output control at the same time as changing the horizontal scanning frequency fmhs, as will be described below, so that the vertical scan width becomes equivalent to a previously given value (target value). Such control over changes in the horizontal and vertical scan widths makes it possible to keep constant both the size and aspect ratio of a displayed image.

Where m1 is the integer m relative to the horizontal scanning frequency fmhs before change in the equation (10) given above; and m2 is the integer m relative to the horizontal scanning frequency fmhs after change, and if the vertical scan width remains unchanged before and after the change of the horizontal scanning frequency fmhs, the following equation (11) holds:

$$q \cdot G1/m1 = q \cdot G2/m2 \tag{11}$$

where q is the number of effective lines in image display (e.g., 768 in the case of XGA); and G1 and G2 are the gain G of the vertical drive circuit before and after the change of the horizontal scanning frequency fmhs.

Transforming the equation (11) given above yields the following equation (12):

$$G2/G1 = m2/m1 \tag{12}$$

Controlling the gain G of the vertical drive circuit in the vertical drive controller 6b based on the above equation (12) keeps the vertical scan width unchanged before and after the change of the horizontal scanning frequency fmhs.

Figure 16:
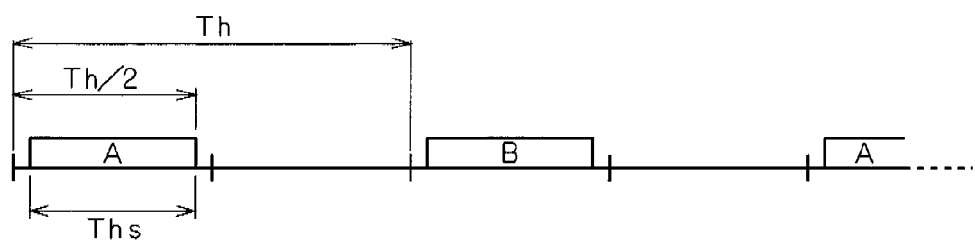
FIG. 16 is a diagrammatic illustration of a readout of data for one scanning line in one horizontal period in one-way display scanning.

The operation of the image-signal controller 52 for the one-way display scanning is as follows: one horizontal line of image data is read out and displayed at high speed during one horizontal-line display period Ths, which is a half (Th/2) of one horizontal period Th as shown in FIG. 16, for a stable image display. In this case, unlike in the case of the reciprocating-display scanning shown in FIG. 12A, it is unnecessary to reverse the order of data every two horizontal lines, so that the data row at point Pa in FIG. 12A, i.e., the input image data fed to the image-signal controller 52, can be utilized as it is.

Second Preferred Embodiment

An image display apparatus 100B according to a second preferred embodiment of the invention has a similar configuration to the image display apparatus 100A of the first preferred embodiment shown in FIGS. 1 to 3, but differs in the structure of its horizontal drive controller.

Specifically, an image-signal controller 520 and a horizontal drive controller 60a in the image display apparatus 100B are configured to store a program or the like for executing operations described below.

<Operation of Image-Signal Controller 520>

The image-signal controller 520 has a similar configuration to the image-signal controller 52 of the first preferred embodiment shown in FIG. 11, but it utilizes this configuration for a different operation from the one described in the first preferred embodiment. To be concrete, in the raster scanning RS (FIG. 1), the image-signal controller 520 can perform, in addition to the same reciprocating-display scanning as described in the first preferred embodiment, reciprocating-display scanning in the opposite direction to the one described in the first preferred embodiment.

FIGS. 17A and 17B are a diagrammatic illustration of the operations of the image-signal controller 520. FIG. 17A corresponds to FIG. 12A.

The image-signal controller 520 according to the second preferred embodiment can perform the same operation as the image-signal controller 52 according to the first preferred embodiment as shown in FIG. 17A.

Besides, the image-signal controller 520 of this preferred embodiment can perform the operation opposite to the operation of the image-signal controller 52 in the first preferred embodiment as shown in FIG. 17B.

More specifically, at point Pb in FIG. 11, one horizontal line of input image data is written into the FILO line memory 522 at the write clock wc, e.g., at a frequency of 65 MHz (=the horizontal synchronizing frequency fh (48.36 kHz)×total horizontal pixels (1344 pixels)) and then is read out at the read clock rc1 of the same frequency as the write clock wc during the next one horizontal period. This forms a data row of the odd-numbered lines of image data, each line of data being sorted in reverse order, with a delay of one horizontal period relative to the data row at point Pa.

At point Pc in FIG. 11, one horizontal line of input image data is written into the FIFO line memory 521 at the write clock wc and then is read out at the read clock rc1 of the same frequency as the write clock wc during the next one horizontal period. This forms a data row of the even-numbered lines of image data with a delay of one horizontal period relative to the data row at point Pa.

At point Pd in FIG. 11, the selector switch 523 switches between the above-described data rows at points Pb and Pc on a horizontal line basis, i.e., on a horizontal period basis, to form a data row. The resultant data row, with a delay of one horizontal period relative to the data row at point Pa and with its odd-numbered lines of data sorted in reverse order, is written into the FIFO frame memory 524 at the write clock wc.

Through the operations described above, the image-signal controller 520 can output an image frame with only even-numbered lines of data sorted in reverse order as shown in FIG. 17A, or can output an image frame with only odd-numbered lines of data sorted in reverse order as shown in FIG. 17B.

<Operation of Horizontal Drive Controller 60a>

The horizontal-readout-frequency setting part 62 in the horizontal drive controller 60a performs the operation of setting the horizontal readout frequency frh obtained from the horizontal scanning frequency, which is selected based on the mechanical resonant frequency detected in the resonance-point detector 56. This is now described in detail below.

In the reciprocating-display scanning when the image-signal controller 520 generates an image frame with only even-numbered lines of data sorted in reverse order as shown in FIG. 17A, as in the first preferred embodiment, image display by the raster scanning RS becomes stable by selecting a horizontal scanning frequency around the mechanical resonant frequency f0 of the optical scanner 1 from candidates for the horizontal scanning frequency fmhd which satisfies the equation (6) given above.

On the other hand, in the reciprocating-display scanning when the image-signal controller 520 alternately generates an image frame with only even-numbered lines of data sorted in reverse order as shown in FIG. 17A and an image frame with only odd-numbered lines of data sorted in reverse order as shown in FIG. 17B, image display by the raster scanning RS becomes stable by selecting a horizontal scanning frequency around the mechanical resonant frequency f0 of the optical scanner 1 from candidates for the horizontal scanning frequency fmhd which satisfies the following equation (13).

$$fmhd = fv \cdot (p+0.5) \quad (13)$$

where fv is the vertical synchronizing frequency; and p is an integer.

In other words, the image display apparatus 100B according to this preferred embodiment can select a horizontal scanning frequency from candidates for the horizontal scanning frequency fmhd which satisfies the condition expressed by the equation (13) given above, i.e., which are (n+0.5) times the vertical synchronizing frequency fv (where n is a natural number).

From the above fact, it can be said that the image display apparatus 100B according to this preferred embodiment has more candidates, about two times candidates, for the horizontal scanning frequency fmhd than there are in the first preferred embodiment. More specifically, as shown in FIG. 18 corresponding to FIG. 14A, the frequencies ffp1 to ffp3 and ffm1 to ffm3 satisfying the equation (13) given above, in addition to the frequencies fp1 to fp3 and fm1 to fm3 satisfying the equation (6) given above, can be candidates for the horizontal scanning frequency fmhd. When the horizontal scanning frequency fmhd is selected from the frequencies fp1 to fp3 and fm1 to fm3 satisfying the equation (6) given above, the image-signal controller 520 performs the operation of generating an image frame as shown in FIG. 17A; whereas, when the horizontal scanning frequency fmhd is selected from the frequencies ffp1 to ffp3 and ffm1 to ffm3 satisfying the equation (13) given above, the image-signal controller 520 performs the operation of generating an image frame as shown in FIG. 17B. This allows a stable image display.

For detection of the mechanical resonant frequency f0 in the resonance-point detector 56, the horizontal scanning frequency fmhd satisfying either the equation (6) or (13) given above is made to sweep in sequence (e.g., in the case of FIG. 18, in the sequence of fm3, ffm3, fm2, ffm2, fm1, ffm1, fp1, ffp1, and so on), in order to observe the displacement angle of the mirror 11 detected in the angle detector 55.

Through the operation described above, the image display apparatus 100B achieves a similar effect to that of the first preferred embodiment. Besides, the image display apparatus 100B can select a horizontal scanning frequency in steps of one half the vertical synchronizing frequency fv as shown in FIG. 18, thereby increasing flexibility of that selection.

The image display apparatuses 100A and 100B according to the first and second preferred embodiments may place the optical scanner 1 in FIG. 2 in a position turned 90 degrees as viewed from the front, specifically in a position as shown in FIG. 19, for the raster scanning of the light beam LT from the light source 50. Placing the optical scanner 1 in such a position (FIG. 19) can reduce the moment of inertia of a movable part with respect to the horizontal direction of the raster scanning RS, in which direction the movable part is driven at a higher speed than in the vertical direction.

Third Preferred Embodiment

An image display apparatus 100C according to a third preferred embodiment of the invention is analogous in configuration to the image display apparatuses 100A and 100B of the first and second preferred embodiments shown in FIG. 1, but it differs in the configuration of its optical scanner.

<Configuration of Essential Parts of Optical Scanner>

Figure 20:
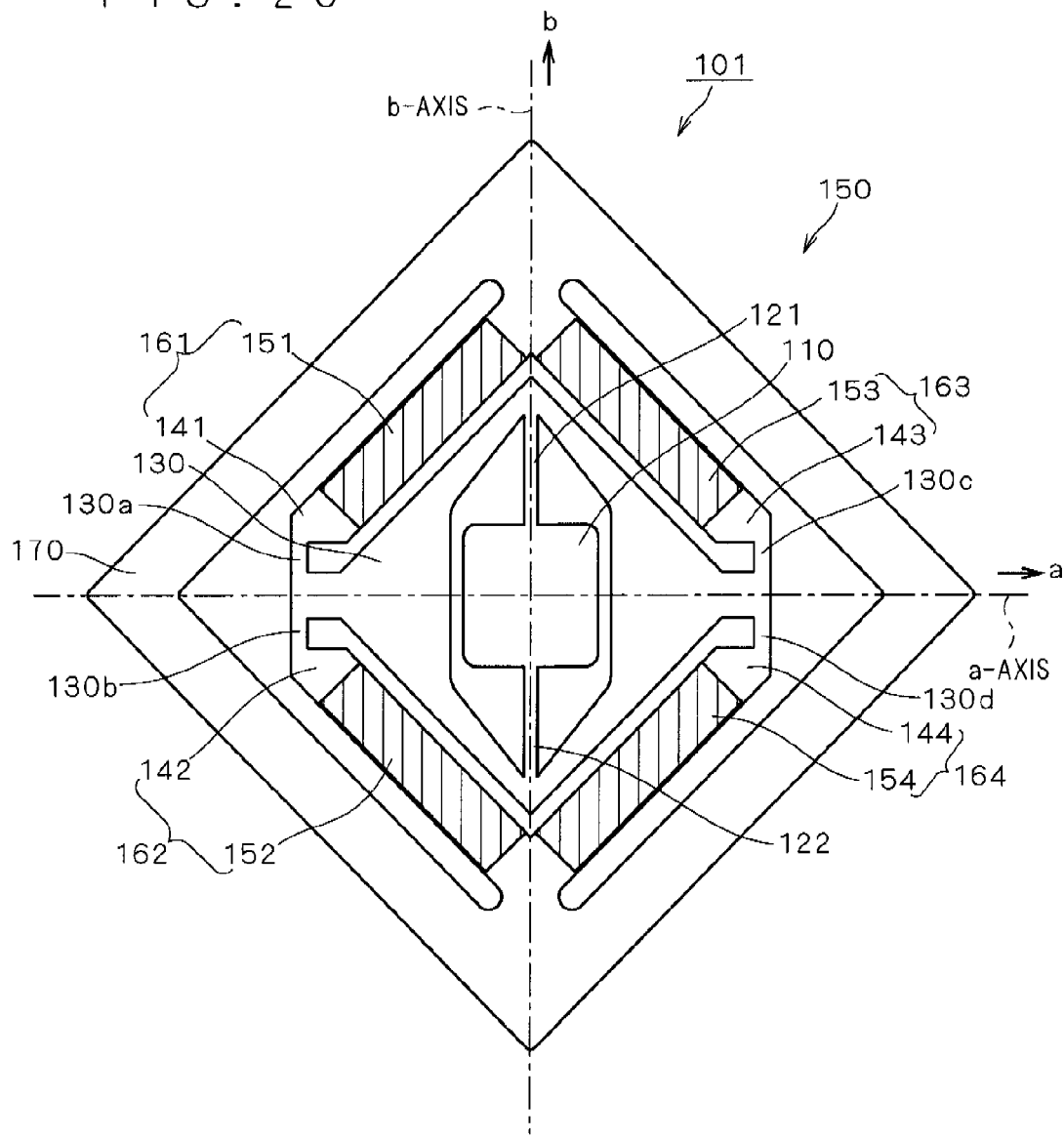
FIG. 20 is a plan view showing a configuration of the essential parts of an optical scanner according to a third preferred embodiment of the invention.

FIG. 20 is a plan view showing a configuration of the essential parts of an optical scanner 101 according to the third preferred embodiment of the invention.

The optical scanner 101 is a so-called MEMS (Micro Electro Mechanical Systems) mirror made by micromachining of a silicon chip. In the following, the optical scanner 101 is also referred to as an MEMS mirror 101 where appropriate.

The optical scanner 101 mainly includes a mirror 110, two torsion bars 121 and 122, a movable frame 130, an actuator part 150 consisting of four piezoelectric elements (piezoelectric actuators) 151 to 154, four erection parts 141 to 144, four narrow coupling parts 130a to 130d, and a fixed frame 170.

The fixed frame 170, fixed to the casing of the image display apparatus 100C, is a frame having four sides and four plate parts disposed in approximately a rectangular shape. Its outer and inner edges form approximately a square with diagonal lines, namely a- and b-axes, which are approximately orthogonal to each other. Its inner edges make approximately a square space.

The two erection parts 141 and 143 are coupled to the inside of the corner of the fixed frame 170 on the positive side of the b-axis (the upper part in FIG. 20); specifically, the erection part 141 is provided along one side of the fixed frame 170 on the negative a-axis side and on the positive b-axis side (the upper left in FIG. 20); and the erection part 143 is provided along one side of the fixed frame 170 on the positive a-axis side and on the positive b-axis side (the upper right in FIG. 20). The two erection parts 142 and 144 are coupled to the inside of the corner of the fixed frame 170 on the negative side of the b-axis (the lower part in FIG. 20); specifically, the erection part 142 is provided along one side of the fixed frame 170 on the negative a-axis side and on the negative b-axis side (the lower left in FIG. 20); and the erection part 144 is provided along one side of the fixed frame 170 on the positive a-axis side and on the negative b-axis side (the lower right in FIG. 20).

The piezoelectric elements 151 to 154 are attached respectively to the erection parts 141 to 144 along the directions of extension of the erection parts 141 to 144. The erection part 141 and the piezoelectric element 151 form an extensible erection part 161 extending from the inside of the corner of the fixed frame 170 on the positive b-axis side (the upper part in FIG. 20) in the −a and −b directions (in the lower-left direction in FIG. 20); the erection part 142 and the piezoelectric element 152 form an extensible erection part 162 extending from the inside of the corner of the fixed frame 170 on the negative b-axis side (the lower part in FIG. 20) in the −a and +b directions (in the upper-left direction in FIG. 20); the erection part 143 and the piezoelectric element 153 form an extensible erection part 163 extending from the inside of the corner of the fixed frame 170 on the positive b-axis side (the upper part in FIG. 20) in the +a and −b directions (in the lower-right direction in FIG. 20); and the erection part 144 and the piezoelectric element 154 form an extensible erection part 164 extending from the inside of the corner of the fixed frame 170 on the negative b-axis side (the lower part in FIG. 20) in the +a and +b directions (in the upper-right direction in FIG. 20).

The extensible erection parts 161 and 162 are spaced at a given distance from each other with the a-axis in between; and the extensible erection parts 163 and 164 are spaced at a given distance from each other with the a-axis in between.

The end of the extensible erection part 161 closer to the a-axis is coupled to the movable frame 130 via the narrow coupling part 130a; the end of the extensible erection part 162 closer to the a-axis is coupled to the movable frame 130 via the narrow coupling part 130b; the end of the extensible erection part 163 closer to the a-axis is coupled to the movable frame 130 via the narrow coupling part 130c; and the end of the extensible erection part 164 closer to the a-axis is coupled to the movable frame 130 via the narrow coupling part 130d.

The movable frame 130, like the fixed frame 170, is a frame having four sides and four plate parts disposed in approximately a rectangular shape. Its outer edges form approximately a square with diagonal lines, namely a- and b-axes, which are approximately orthogonal to each other, and its inner edges make a hexagonal space.

The torsion bar 121 is provided on the inside of the corner of the movable frame 130 on the positive side of the b-axis (the upper part in FIG. 20) to extend in the −b direction (the downward direction in FIG. 20); and the torsion bar 122 is provided on the inside of the corner of the movable frame 130 on the negative side of the b-axis (the lower part in FIG. 20) to extend in the +b direction (the upward direction in FIG. 20).

The mirror 110 is coupled to the end of the torsion bar 121 which is not coupled to the movable frame 130 and to the end of the torsion bar 122 which is not coupled to the movable frame 130. In other words, the torsion bars 121 and 122 support the mirror 110 in such a manner as to sandwich the mirror 110 from both the +b and −b directions. That is, the movable frame 130 supports the torsion bars 121 and 122 together with the mirror 110.

The mirror 110 is a reflecting mirror of approximately a square shape having, as its outer edges, two sides approximately parallel to the a-axis and two sides approximately parallel to the b-axis. The mirror 110 is disposed in about the center of the optical scanner 101 to reflect a laser beam for projection.

The two torsion bars 121 and 122, small in thickness and having a thin long shape, undergoes elastic deformation with relative ease. The narrow coupling parts 130a to 130d also undergoes elastic deformation with relative ease because of their thin and narrow shapes.

Now a concrete description is given of turning motion of the mirror 110. Application of voltage to the piezo electric elements 151 to 154 where appropriate changes the lengths of the piezo electric elements 151 to 154 depending on the voltage applied, so that the erection parts 141 to 144 with the piezoelectric elements 151 to 154 attached thereto expand and/or contract in the directions of their extension. That is, the extensible erection parts 161 to 164 expand and/or contract in the directions of their extension. From this, for example when the voltage applied to the piezoelectric elements 151 and 153 and the voltage applied to the piezoelectric elements 152 and 154 are opposite in polarity, i.e., when voltages of opposite phases are applied to the piezoelectric elements 151 and 153 and the piezoelectric elements 152 and 154, the mirror 110 turns around the a-axis. On the other hand, for example when the voltage applied to the piezo electric elements 151 and 152 and the voltage applied to the piezoelectric elements 153 and 154 are opposite in polarity, i.e., when voltages of opposite phases are applied to the piezoelectric elements 151 and 152 and the piezoelectric elements 153 and 154, the mirror 110 turns around the b-axis.

Then, a drive signal causing the mirror 110 to turn around the a-axis and a drive signal causing the mirror 110 to turn around the b-axis are superimposed on each other and applied to the four piezoelectric elements 151 to 154. This signal application induces resonant drive of the mirror 110 around the b-axis where the torsion bars 121 and 122 serve as a fulcrum, and drive of the mirror 110 to turn the movable frame 130 around the a-axis together with the mirror 110 and the torsion bars 121 and 122. From this, although being a single device with a single mirror 110, the optical scanner 101 can make both low-speed turning motion about the a-axis, and high-speed turning motion about the b-axis utilizing resonant drive. That is, the light beam LT (FIG. 2) from the light source 50 is deflected in two different directions, so that both horizontal and vertical scanning of the light beam LT (FIG. 2) become possible on the screen 9 (FIG. 1). In other words, the actuator part 150 provided with the four piezoelectric elements 151 to 154 includes a first oscillating part for causing the mirror (movable part) 110, which reflects the light beam LT emitted from the light source 50, to oscillate around the b-axis for horizontal scanning of the light beam LT; and a second oscillating part for causing the mirror 110 to oscillate around the a-axis, which intersects with the b-axis at approximately a right angle, for vertical scanning of the light beam LT. Two-dimensional scanning, where horizontal and vertical scanning are performed simultaneously, using only a single device is preferable from the viewpoint of reducing the number of parts of the optical scanner 101, and also from the viewpoints of reducing the manufacturing cost and work required for device adjustment.

By effecting the same operations as those of the image-signal controllers 52 and 520 and the horizontal drive controller 60a in the first and second preferred embodiments described above, the optical scanner 101 with the above-described configuration can also achieve the same effects as described in the first and second preferred embodiments.

While, in the third preferred embodiment, two-dimensional scanning of the light beam LT (FIG. 2) from the light source 50 (FIG. 1) can be achieved by turning one mirror 110 of the optical scanner 101 about the two axes (the a-axis and the b-axis) which are appropriately orthogonal to each other, the present invention is not limited thereto; horizontal beam scanning and vertical beam scanning may be achieved by turning two separate mirrors, for two-dimensional scanning of the light beam LT from the light source 50. One concrete example of such a configuration is that a first actuator causing a first mirror (a first movable part) to oscillate around an a'-axis, the first mirror reflecting the light beam LT from the light source 50, and a second actuator causing a second mirror (a second movable part) to oscillate around a b'-axis, the second mirror reflecting the light beam LT reflected off the first mirror, are located sequentially in space on an optical path from the light source 50 to the screen 9 (FIG. 1). In order to achieve horizontal and vertical scanning, it is preferable that both the a'- and b'-axes be approximately orthogonal to a line inside and along the optical path from the light source 50 to the screen 9 (more preferably, a center line of the optical path), and that, as to the relative positions and angles of the a'- and b'-axes, for example, the a'- and b'-axes be spaced at a given distance from each other along the center line of the optical path described above and they are in a 90-degree rotated relation around the center line of the optical path described above. In other words, it is preferable the b'-axis be spaced at a given distance from the a'-axis along a given straight line approximately orthogonal to the a'-axis, and be rotated about 90 degrees around the given straight line.

<Modifications>

Figure 21:
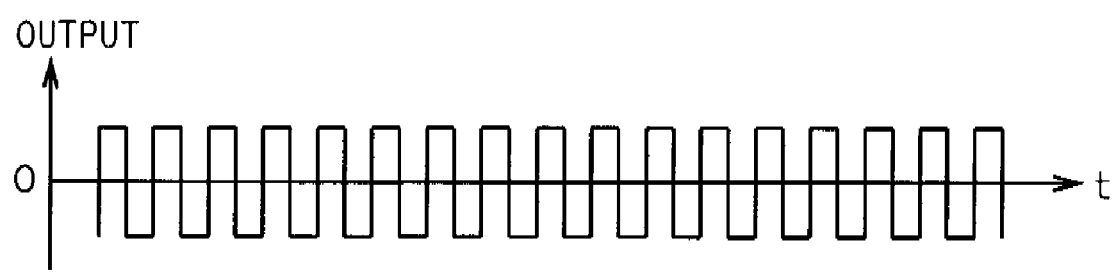
FIG. 21 is a diagrammatic illustration of a rectangular drive signal according to a modification of the invention.

In the preferred embodiments described above, the use of a drive signal of simple harmonic motion as shown in FIG. 10 is not an absolute necessity, and a rectangular drive signal as shown in FIG. 21 may be used. Even such a rectangular drive signal can induce resonant oscillation of the mirror 11 as long as it has a frequency component around the mechanical resonant frequency.

The angle detector in the preferred embodiments described above does not necessarily use the photoreflector 550 (FIG. 4) for detection of the displacement angle of the mirror 11 or 110, and instead it may use, for example, an output signal from a displacement-angle sensor such as piezoelectric elements attached to torsion bars for detection of the displacement angle of the mirror 11.

The optical scanner in the preferred embodiments described above does not necessarily use piezoelectric elements as an actuator for causing oscillatory displacement of the mirror 11 or 110, and instead it may use other actuators such as an electromagnetic actuator, e.g., VCM; an electrostatic actuator, e.g., an electrostatic vibrator; and an actuator using high polymers.

In the preferred embodiments described above, the use of an optical scanner with two oscillatory axes for beam raster scanning is not a necessity, and instead, a pair of optical scanners each having one oscillatory axis may be used for the raster scanning. In this case also, for beam raster scanning, a mirror provided as a movable part in each of the optical scanners is oscillated about the axes of the optical scanner intersecting with each other at approximately a right angle.

In the preferred embodiments described above, it is not an absolute necessity for the resonance-point detector 56 to detect the mechanical resonant frequency of oscillatory motion of the mirror 11 based on the result of detection in the angle detector 55; and those parts may be omitted. In this case, for example at the time of testing each product relevant to an image display apparatus, the resonant frequency may be measured and stored in a memory such as the optical-scanner controller 6.

While the invention has been shown and described in detail, the foregoing description is in all aspects illustrative and not restrictive. It is therefore understood that numerous modifications and variations can be devised without departing from the scope of the invention.

What is claimed is:

1. An image display apparatus capable of displaying an image on a given plane of projection by beam raster scanning, said image display apparatus comprising:
   (a) an actuator part capable of causing a movable part to oscillate about a first axis and a second axis, said movable part having a reflecting surface reflecting a light beam emitted from a given light source, said second axis intersecting with said first axis at approximately a right angle;

(b) a main scanning unit driving said actuator part based on a first drive signal of a first frequency to cause said movable part to oscillate about said first axis, thereby scanning said light beam reflected off said reflecting surface in a main scanning direction of said raster scanning; and (c) a sub-scanning unit driving said actuator part based on a second drive signal of a second frequency to cause said movable part to oscillate about said second axis, thereby scanning said light beam reflected off said reflecting surface in a sub-scanning direction of said raster scanning, said main scanning unit including a setting part for, out of specific frequencies calculated based on said second frequency, setting a frequency around a resonant frequency relevant to oscillatory motion of said movable part as said first frequency.

2. The image display apparatus according to claim 1, wherein said main scanning unit includes a detector for detecting a frequency corresponding to said resonant frequency.

3. The image display apparatus according to claim 1, wherein said specific frequencies are n times said second frequency (where n is a natural number).

4. The image display apparatus according to claim 1, wherein said specific frequencies are (n+0.5) times said second frequency (where n is a natural number).

5. The image display apparatus according to claim 1, wherein out of said specific frequencies, said setting part sets a frequency nearest to said resonant frequency as said first frequency.

6. The image display apparatus according to claim 2, wherein said main scanning unit generates drive signals of a plurality of frequencies calculated based on said second frequency, as said first drive signal, and said detector detects a frequency corresponding to said resonant frequency by driving said actuator part based on each of said drive signals to cause said movable part to oscillate about said first axis and making a comparison on an amplitude of an oscillation angle of said movable part for each of said drive signals.

7. The image display apparatus according to claim 2, wherein said main scanning unit generates drive signals of a plurality of frequencies calculated based on said second frequency, as said first drive signal, and said detector detects a frequency corresponding to said resonant frequency by driving said actuator part based on each of said drive signals to cause said movable part to oscillate about said first axis and making a comparison on a phase of an oscillation angle of said movable part for each of said drive signals.

8. The image display apparatus according to claim 2, wherein said frequency detected in said detector is calculated based on said second frequency.

9. The image display apparatus according to claim 2, wherein said setting part includes a changer for changing said first frequency with a change in said frequency detected in said detector, and a phase of an oscillation angle of said movable part for each drive signal of said first frequency remains approximately unchanged before and after a change of said first frequency by said changer.

10. An image display apparatus capable of displaying an image on a given plane of projection by beam raster scanning, said image display apparatus comprising:

(a) a first actuator causing a first movable part to oscillate about a first axis, said first movable part having a first reflecting surface reflecting a light beam emitted from a given light source;

(b) a second actuator causing a second movable part to oscillate about a second axis, said second movable part having a second reflecting surface reflecting said light beam reflected off said first reflecting surface;

(c) a main scanning unit driving said first actuator based on a first drive signal of a first frequency to cause said first movable part to oscillate about said first axis, thereby scanning said light beam reflected off said first reflecting surface in a main scanning direction of said raster scanning; and (d) a sub-scanning unit driving said second actuator based on a second drive signal of a second frequency to cause said second movable part to oscillate about said second axis, thereby scanning said light beam reflected off said second reflecting surface in a sub-scanning direction of said raster scanning, said main scanning unit including a setting part for, out of specific frequencies calculated based on said second frequency, setting a frequency around a resonant frequency relevant to oscillatory motion of said first movable part as said first frequency.

11. An image display apparatus capable of displaying an image on a given plane of projection by beam raster scanning, said image display apparatus comprising:

(a) a first actuator causing a first movable part to oscillate about a first axis, said first movable part having a first reflecting surface reflecting a light beam emitted from a given light source;

(b) a second actuator causing a second movable part to oscillate about a second axis, said second movable part having a second reflecting surface reflecting said light beam reflected off said first reflecting surface;

(c) a main scanning unit driving said second actuator based on a first drive signal of a first frequency to cause said second movable part to oscillate about said second axis, thereby scanning said light beam reflected off said second reflecting surface in a main scanning direction of said raster scanning; and (d) a sub-scanning unit driving said first actuator based on a second drive signal of a second frequency to cause said first movable part to oscillate about said first axis, thereby scanning said light beam reflected off said first reflecting surface in a sub-scanning direction of said raster scanning, said main scanning unit including a setting part for, out of specific frequencies calculated based on said second frequency, setting a frequency around a resonant frequency relevant to oscillatory motion of said second movable part as said first frequency.

* * * * *